US007250214B2

(12) United States Patent
Walter et al.

(10) Patent No.: US 7,250,214 B2
(45) Date of Patent: *Jul. 31, 2007

(54) POROUS INORGANIC/ORGANIC HYBRID MONOLITH MATERIALS FOR CHROMATOGRAPHIC SEPARATIONS AND PROCESS FOR THEIR PREPARATION

(75) Inventors: Thomas H. Walter, Ashland, MA (US); Julia Ding, Watertown, MA (US); Marianna Kele, Worcester, MA (US); John E. O'Gara, Ashland, MA (US); Pamela C. Iraneta, Brighton, MA (US)

(73) Assignee: Waters Investments Limited, New Castle, DE (US)

( * ) Notice: Subject to any disclaimer, the term of this patent is extended or adjusted under 35 U.S.C. 154(b) by 391 days.

This patent is subject to a terminal disclaimer.

(21) Appl. No.: 10/216,674

(22) Filed: Aug. 8, 2002

(65) Prior Publication Data

US 2003/0150811 A1  Aug. 14, 2003

Related U.S. Application Data

(60) Provisional application No. 60/311,445, filed on Aug. 9, 2001.

(51) Int. Cl.
*B32B 15/02* (2006.01)

(52) U.S. Cl. ............... 428/405; 428/402; 428/404; 210/656; 502/402; 502/527.18

(58) Field of Classification Search ................. 428/405, 428/402, 404
See application file for complete search history.

(56) References Cited

U.S. PATENT DOCUMENTS 4,017,528 A   4/1977   Unger et al. ............ 260/448 R
4,029,583 A   6/1977   Chang et al.
4,889,632 A   12/1989  Svec et al.
4,923,610 A   5/1990   Svec et al.
4,952,349 A   8/1990   Svec et al.
5,271,833 A   12/1993  Funkenbusch et al.
5,453,185 A   9/1995   Frechet et al.

(Continued)

FOREIGN PATENT DOCUMENTS

| EP | 0 852 334 A1 | 7/1998 |
|----|--------------|--------|
| JP | 7247180 | 9/1995 |
| JP | 2893104 B2 | 5/1999 |
| WO | WO 00/45951 * | 8/2000 |
| WO | WO 03/14450 | 2/2003 |
| WO | WO 03/22392 | 3/2003 |
| WO | WO 04/41398 | 5/2004 |

OTHER PUBLICATIONS

Asiaie et al., Sintered Octadecylsilica as Monolithic Column Packing in Capillary Electrochromatography and micro High-Performance Liquid Chromatography, Journal of chromatography A, 806 (1998), 251-263}.*

(Continued)

*Primary Examiner*—Thurman K. Page
*Assistant Examiner*—Chukwuma Nwaonicha
(74) *Attorney, Agent, or Firm*—Edwards Angell Palmer & Dodge LLP; Peter C. Lauro, Esq.

(57) ABSTRACT

Novel materials for chromatographic separations, processes for their preparation, and separation devices containing the chromatographic materials. In particular, the novel materials are porous inorganic/organic hybrid monolith materials, which desirably may be surface modified, and which offer more efficient chromatographic separations than that known in the art.

84 Claims, 2 Drawing Sheets

U.S. PATENT DOCUMENTS

| | | | |
|---|---|---|---|
| 5,548,051 | A | 8/1996 | Michalczyk et al. |
| 5,650,474 | A | 7/1997 | Yamaya et al. |
| 5,728,457 | A | 3/1998 | Frechet et al. |
| 5,869,152 | A | 2/1999 | Colon ............... 428/34.4 |
| 6,017,632 | A | 1/2000 | Pinnavaia et al. |
| 6,027,643 | A | 2/2000 | Small et al. |
| 6,090,477 | A | 7/2000 | Burchell et al. ......... 428/293.4 |
| 6,136,187 | A | 10/2000 | Zare et al. |
| 6,207,098 | B1 | 3/2001 | Nakanishi et al. .......... 264/414 |
| 6,210,570 | B1 | 4/2001 | Holloway |
| 6,238,565 | B1 | 5/2001 | Hatch |
| 6,248,686 | B1 | 6/2001 | Inagaki et al. |
| 6,277,304 | B1 | 8/2001 | Wei et al. |
| 6,281,257 | B1 | 8/2001 | Ma et al. |
| 6,380,266 | B1 | 4/2002 | Katz et al. |
| 6,686,035 | B2 * | 2/2004 | Jiang et al. ............... 428/304.4 |
| 2003/0150811 | A1 | 8/2003 | Walter et al. |

OTHER PUBLICATIONS

Hileman, F.D. et al. Anal. Chem. 1973, 45, pp. 1126.
Hanson, M. J. Chromatography A, 1993, 656, pp. 369.
Petro, M. et al., Chromatographia, 1993, 9/10, pp. 549.
Tamaki, Polymer Bull. 1997, 39, pp. 303.
Perry, R. J. Chemtech 1999, pp. 39.
Grun, M. et al. Microporous and Mesoporous Materials 1999, 27, pp. 207.
Inagaki, S. et al. J. Am. Chem. Soc. 1999, 121, 9611.
Berenitski, et al. J. Chromatog. A. 1998, 828: 59-73.
Boury et al. New J. Chem. 1999, 23: 531-538.
Boury et al. Chem. Mater. 1999, 11: 281-291.
Collioud et al. Bioconjugate, 1993, 4: 528-536.
Czajkowska et al. J. Liq. Chromatog. Relat. Technol. 1998, 21: 1957-1977.
Jones et al. Tetrahedron, 1996, 52(22): 7599-7662.
MacBeath et al. Science, 2000, 289: 1760-1763.
Maskos, et al. Nucleic Acids Research, 1992, 20(7): 1679-1684.
Nawrocki, et al. J. Chromatography, 1988, 449(1): 1-24.
Nawrocki, et al. Chromatographia, 1991, 31(3-4): 177-192.
O'Gara, et al. Analytical Chemistry, 1995, 67: 3809-3813.
O'Gara et al. J. Chromatog. A. 2000, 893: 245-251.
Tamao et al. Tetrahedron, 1982, 39(6): 983-990.
Tamao et al. Organometallics 2 1983, 2: 1694-1696.
Tamao et al. Advances in Silicon Chemistry, 1996, 3: 1-62.
Yang et al. Anal. Chem. 1998, 70: 2827-2830.
M. T. Dulay, R. P. Kulkarni, R. N. Zare, "Preparation and Characterization of Monolithic Porous Capillary Columns Loaded with Chromatographic Particles", *Anal. Chem.*, 70(23): 5103-5107 (1998).
Xin, B.; Lee, M. L., "Design and Evaluation of a New Capillary Electrochromatography System", *Electrophoresis*, 20: 67-73 (1999).
Q. Tang, B. Xin, M. L. Lee, "Monolithic Columns Containing Sol-Gel Bonded Octadecylsilica for Capillary Electrochrmoatography", *J. Chromatogr. A*, 837: 35-50 (1999).
Q. Tang, N. Wu, M. L. Lee, "Continuous-Bed Columns Containing Sol-Gel Bonded Octadecylsilica for Capillary Liquid Chromatography", *J. Microcolumn Separations*, 12: 6-12 (2000).
R. Asiaie, X. Huang, D. Farnan, Cs. Horvath, "Sintered Octadecylsilica as Monolithic Column Packing in Capillary Electrochromatography and Micro High-Performacne Liquid Chromatography", *J. Chromatogr. A*, 806: 251-263 (1998).
S. Ueno, K. Muraoka, H. Yoshimatsu, A. Osaka, Y Miura, "Compaction an dSintering Behavior of Silica Particles Surface-Modified by Al Chelate Compounds", *Journal of the Ceramic Society of Japan*, 109(3): 210-216 (2001).
A. Goldstein, R. Ruginets, Y. Geffen, Microwave Sintereing of Amorphous Silica Powders, *J. of Mat. Sci. Letters*, 16: 310-312 (1997).

\* cited by examiner

POROUS INORGANIC/ORGANIC HYBRID MONOLITH MATERIALS FOR CHROMATOGRAPHIC SEPARATIONS AND PROCESS FOR THEIR PREPARATION

RELATED APPLICATIONS

This application claims priority to U.S. Provisional Patent Application No. 60/311,445, filed Aug. 9, 2001, the contents of which are hereby expressly incorporated herein by reference in its entirety.

BACKGROUND OF THE INVENTION

Packing materials for liquid chromatography (LC) are generally classified into two types: organic materials, e.g., polydivinylbenzene, and inorganic materials typified by silica. Many organic materials are chemically stable against strongly alkaline and strongly acidic mobile phases, allowing flexibility in the choice of mobile phase pH. However, organic chromatographic materials generally result in columns with low efficiency, leading to inadequate separation performance, particularly with low molecular-weight analytes. Furthermore, many organic chromatographic materials shrink and swell when the composition of the mobile phase is changed. In addition, most organic chromatographic materials do not have the mechanical strength of typical chromatographic silicas.

Due in large part to these limitations, silica is the material most widely used in High Performance Liquid Chromatography (HPLC). The most common applications employ silica that has been surface-derivatized with an organic group such as octadecyl ($C_{18}$), octyl ($C_8$), phenyl, amino, cyano, etc. As stationary phases for HPLC, these packing materials result in columns that have high efficiency and do not show evidence of shrinking or swelling.

Silica is characterized by the presence of silanol groups on its surface. During a typical derivatization process such as reaction with octadecyldimethylchlorosilane, at least 50% of the surface silanol groups remains unreacted. These residual silanol groups interact with basic and acidic analytes via ion exchange, hydrogen bonding and dipole/dipole mechanisms. The residual silanol groups create problems including increased retention, excessive peak tailing and irreversible adsorption of some analytes. Another drawback with silica-based columns is their limited hydrolytic stability. First, the incomplete derivatization of the silica leaves patches of bare silica surface which can be readily dissolved under alkaline conditions, generally pH>8.0, leading to the subsequent collapse of the chromatographic bed. Second, the bonded phase can be stripped off the surface under acidic conditions, generally pH<2.0, and eluted off the column by the mobile phase, causing loss of analyte retention, and an increase in the concentration of surface silanol groups.

To overcome the problems of residual silanol group activity and hydrolytic instability of silica-based stationary phases, many methods have been tried including use of ultrapure silica, carbonized silica, coating of the silica surface with polymeric materials, endcapping free silanol groups with a short-chain reagent such as trimethylsilane, and the addition of suppressors such as amines to the eluant. These approaches have not proven to be completely satisfactory in practice.

One approach is disclosed in U.S. Pat. No. 4,017,528. A process for preparing a hybrid silica is described wherein an alkyl functionality is coupled into both the skeleton structure and the surface of the silica. According to the '528 patent, the hybrid silica can be prepared by two methods. In the first method, a mixture of tetraethoxysilane (TEOS) and an organotriethoxysilane, e.g., alkyltriethoxysilane, is co-hydrolyzed in the presence of an acid catalyst to form a liquid material containing polyorganoethoxysiloxane (POS) oligomers, e.g., polyalkylethoxysiloxane oligomers. Then, the POS is suspended in an aqueous medium and gelled into porous hybrid particles in the presence of a base catalyst. In the second method, the material is prepared by a similar procedure except that the suspension droplet is a mixture of organotriethoxysilane, e.g., alkyltriethoxysilane, and polyethoxysiloxane (PES) oligomers; the latter is prepared by partial hydrolysis of TEOS.

There are several problems associated with the '528 hybrid material. First, these hybrid materials contain numerous micropores, i.e., pores having a diameter below about 34 Å. It is known that such micropores inhibit solute mass transfer, resulting in poor peak shape and band broadening.

Second, the pore structure of the '528 hybrid material is formed because of the presence of ethanol (a side product of the gelation process) within the suspension oil droplets. The pore volume is controlled by the molecular weight of the POS or PES. The lower the molecular weight of the POS or PES, the more ethanol is generated during the gelation reaction, and subsequently a larger pore volume is produced. However, part of the ethanol generated during the gelation is able to diffuse into the aqueous phase by partition. If the amount of the ethanol generated within the suspension droplets is too great, the partition of the ethanol will cause the structure of the droplets to collapse, forming irregularly-shaped particles as opposed to spherical particles. Therefore, the strategy to control the pore volume of the hybrid material described in the '528 patent has certain limitations, particularly for preparing highly spherical hybrid materials with a pore volume greater than about 0.8 $cm^3$/g. It is well known in the art that irregularly-shaped materials are generally more difficult to pack than spherical materials. It is also known that columns packed with irregularly-shaped materials generally exhibit poorer packed bed stability than spherical materials of the same size.

Third, the '528 hybrid materials are characterized by an inhomogeneous particle morphology, which contributes to undesirable chromatographic properties, including poor mass transfer properties for solute molecules. This is a consequence of the gelation mechanism, where the base catalyst reacts rapidly near the surface of the POS droplet, forming a "skinned" layer having very small pores. Further gelation in the interior of the droplet is then limited by the diffusion of catalyst through this outer layer towards the droplet center, leading to particles having skeletal morphologies and hence pore geometries, e.g., "shell shaped", which can vary as a function of location between the particle center and outer layer.

A further problem associated with silica particles and polymer particles is packed bed stability. Chromatography columns packed with spherical particles can be considered to be random close packed lattices in which the interstices between the particles form a continuous network from the column inlet to the column outlet. This network forms the interstitial volume of the packed bed which acts as a conduit for fluid to flow through the packed column. In order to achieve maximum packed bed stability, the particles must be tightly packed, and hence, the interstitial volume is limited in the column. As a result, such tightly packed columns afford high column backpressures which are not desirable.

Moreover, bed stability problems for these chromatography columns are still typically observed, because of particle rearrangements.

In an attempt to overcome the problem of packed bed stability, several groups have reported studies on stabilizing the packed bed by sintering or interconnecting inorganic, e.g., silica based particles. In the sintering process, particles are joined to one another by grain boundaries. In one approach, previously prepared octadecylsilica particles are immobilized in a sol-gel matrix or a polymer matrix prepared in situ in a chromatography column. In another approach, agglomeration of the silica based C-18 particles at high temperature has been reported (M. T. Dulay, R. P. Kulkarni, R. N. Zare, *Anal. Chem.*, 70 (1998) 5103; Xin, B.; Lee, M. L. *Electrophoresis* 1999, 20, 67; Q. Tang, B. Xin, M. L. Lee, *J. Chromatogr. A*, 837 (1999) 35; Q. Tang, N. Wu, M. L. Lee, *J. Microcolumn Separations*, 12 (2000) 6; R. Asiaie, X. Huang, D. Faman, Cs. Horvath, *J. Chromatogr. A*, 806 (1998) 251). In addition, interconnection of silica particles surface modified by Al chelate compounds (S. Ueno, K. Muraoka, H. Yoshimatsu, A. Osaka, Y Miura, Journal-Ceramic Society Japan, 109 (2001) 210.) and microwave sintering of silica particles (A. Goldstein, R. Ruginets, Y. Geffen, *J. of Mat. Sci. Letters*, 16 (1997) 310) have been reported. The interstitial porosity of the above particle-sintered or interconnected columns, and hence the permeability of the columns obtained by this approach is less than or similar to those of the conventional packed columns. Therefore, the backpressures of the column are the same or higher than those of the conventional packed columns, and result in an inability to achieve high efficiency chromatographic separations at low backpressures and high flow rates.

In an attempt to overcome the combined problems of packed bed stability and high efficiency separations at low backpressures and high flow rates, several groups have reported the use of monolith materials in chromatographic separations. Monolith materials are characterized by a continuous, interconnected pore structure of large macropores, the size of which can be changed independent of the skeleton size without causing bed instability. The large macropores allow liquid to flow directly through with very little resistance resulting in very low backpressures, even at high flow rates.

However there are several critical drawbacks associated with existing monolith materials. Columns made using organic monolith materials, e.g., polydivinylbenzene, generally have low efficiency, particularly for low molecular weight analytes. Although organic monoliths are chemically stable against strongly alkaline and strongly acidic mobile phases, they are limited in the composition of organic solvent in the mobile phase due to shrinking or swelling of the organic polymer, which can negatively affect the performance of these monolithic columns. For example, as a result of monolith shrinking, the monolith can lose contact with the wall and thus allow the eluent to by-pass the bed, whereupon chromatographic resolution is dramatically decreased. Despite the fact that organic polymeric monoliths of many different compositions and processes have been explored, no solutions have been found to these problems.

In addition, chromatographic columns have also been made from inorganic monolith materials, e.g., silica. Inorganic silica monoliths do not show evidence of shrinking and swelling, and exhibit higher efficiencies than their organic polymeric counterparts in chromatographic separations. However, silica monoliths suffer from the same major disadvantages described previously for silica particles: residual silanol groups after surface derivatization create problems that include increased retention, excessive tailing, irreversible adsorption of some analytes, and the dissolution of silica at alkaline pH values. In fact, as the variation of the pH is one of the most powerful tools in the manipulation of chromatographic selectivity, there is a need to expand the use of chromatographic separations into the alkaline pH range for monolith materials, without sacrificing analyte efficiency, retention and capacity.

Hybrid silica monoliths offer a potential solution to overcome the problems of residual silanol group activity and hydrolytic instability of silica-based monoliths, wherein an alkyl functionality is coupled into both the skeleton structure and the surface of the silica. Several approaches are disclosed in U.S. Pat. No. 6,207,098 and Japanese patent application 2,893,104. However, the materials produced by the processes disclosed in these patents require a calcination step to form the porous gel. At temperatures above 400° C., many organic groups on the surface can be destroyed, leaving the surface unprotected. Furthermore, silanol groups can be irreversibly condensed above 400° C., leaving behind more acidic silanols. As a result, some analytes, particularly basic analytes, can suffer from increased retention, excessive tailing and irreversible adsorption. In addition, the hybrid monoliths produced by this process contain numerous micropores, i.e., pores having a diameter below 34 Å, which are known to inhibit solute mass transfer, resulting in poor peak shape and band broadening.

In an alternative approach, U.S. Pat. No. 5,869,152 discloses a hybrid silica wherein at least a portion of silicon is bonded to an alkyl moiety. However, the materials produced by this process are essentially unimodal in their pore size and lack mesopores to create a surface area sufficient for long analyte retention and high analyte loading capacity in a reversed-phase (RP) HPLC mode.

SUMMARY OF THE INVENTION

The present invention relates to novel porous inorganic/organic hybrid materials and their use in chromatographic separations, processes for their preparation, and separations devices containing the chromatographic material. Thus, one aspect of the invention is a porous inorganic/organic hybrid material, comprising a chromatographically-enhancing pore geometry.

Another aspect of the invention is directed to a porous inorganic/organic hybrid material, wherein pores of a diameter of less than about 34 Å contribute less than about 110 $m^2/g$ to less than about 50 $m^2/g$ to the specific surface area of the material.

Yet another aspect of the invention is a porous inorganic/organic hybrid monolith material, comprising a chromatographically-enhancing pore geometry.

Still another aspect of the invention is a porous inorganic/organic hybrid monolith material, wherein pores of a diameter of less than about 34 Å contribute less than about 110 $m^2/g$ to less than about 50 $m^2/g$ to the specific surface area of the material.

Another aspect of the invention is a porous inorganic/organic hybrid monolith material, comprising coalesced porous inorganic/organic hybrid particles having a chromatographically-enhancing pore geometry.

Another aspect of the invention is a porous inorganic/organic hybrid monolith material, comprising coalesced porous inorganic/organic hybrid particles that have a chromatographically-enhancing pore geometry, wherein said particles have been surface modified by a surface modifier selected from the group consisting of an organic group surface modifier, a silanol group surface modifier, a polymeric coating surface modifier, and combinations thereof.

Another aspect of the present invention is a method of preparation of a porous inorganic/organic hybrid monolith material, comprising porous inorganic/organic hybrid particles having a chromatographically-enhancing pore geometry, comprising the steps of
  a) forming porous inorganic/organic hybrid particles,
  b) modifying the pore structure of the porous hybrid particles, and
  c) coalescing the porous hybrid particles to form a monolith material.

An additional aspect of the invention is a method of preparation of a porous inorganic/organic hybrid monolith material, comprising porous inorganic/organic hybrid particles that have a chromatographically-enhancing pore geometry, comprising the steps of
  a) forming porous inorganic/organic hybrid particles,
  b) modifying the pore structure of said porous hybrid particles,
  c) surface modifying said porous hybrid particles, and
  d) coalescing said porous hybrid particles to form a monolith material, wherein said particles have been surface modified by a surface modifier selected from the group consisting of an organic group surface modifier, a silanol group surface modifier, a polymeric coating surface modifier, and combinations thereof.

In another aspect, the invention is separations device comprising a porous inorganic/organic hybrid monolith material having a chromatographically-enhancing pore geometry.

In yet another aspect, the invention is a separations device comprising a porous inorganic/organic hybrid monolith material, wherein said monolith material has a chromatographically-enhancing pore geometry and is comprised of coalesced porous inorganic/organic hybrid particles, and wherein said particles have been surface modified by a surface modifier selected from the group consisting of an organic group surface modifier, a silanol group surface modifier, a polymeric coating surface modifier, and combinations thereof.

Another aspect of the invention is a chromatographic column having improved lifetime, comprising
  a) a column having a cylindrical interior for accepting a monolith material of porous inorganic/organic hybrid material, and
  b) a chromatographic bed comprising a porous inorganic/organic hybrid monolith material having a chromatographically-enhancing pore geometry of the formula $SiO_2/(R^2_p R^4_q SiO_t)_n$ or $SiO_2/[R^6(R^2_r SiO_t)_m]_n$ wherein $R^2$ and $R^4$ are independently $C_1$-$C_{18}$ aliphatic, styryl, vinyl, propanol, or aromatic moieties, $R^6$ is a substituted or unsubstituted $C_1$-$C_{18}$ alkylene, alkenylene, alkynylene or arylene moiety bridging two or more silicon atoms, p and q are 0, 1 or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2, and n is a number from 0.03 to 1.

Yet another aspect of the invention is a chromatographic column having improved lifetime, comprising
  a) a column having a cylindrical interior for accepting a monolith material of porous inorganic/organic hybrid material, and
  b) a chromatographic bed comprising a porous inorganic/organic hybrid monolith material having a chromatographically-enhancing pore geometry, wherein said monolith material has been surface modified by a surface modifier selected from the group consisting of an organic group surface modifier, a silanol group surface modifier, a polymeric coating surface modifier, and combinations thereof.

In addition, one aspect of the invention is a method of preparation of a porous inorganic/organic hybrid monolith material, comprising coalesced porous particles of hybrid silica having a chromatography-enhancing pore geometry, comprising the steps of
  a) prepolymerizing a mixture of one or more organoalkoxysilanes and a tetraalkoxysilane in the presence of an acid catalyst to produce a polyorganoalkoxysiloxane;
  b) preparing an aqueous suspension of the polyorganoalkoxysiloxane, the suspension further comprising a surfactant or combination of surfactants, and gelling in the presence of a base catalyst so as to produce porous hybrid particles;
  c) modifying the pore structure of the porous hybrid particles by hydrothermal treatment; and
  d) coalescing the porous hybrid particles to form a monolith material thereby preparing a porous inorganic/organic hybrid monolith material.

In another aspect, the present invention is a porous inorganic/organic hybrid monolith material comprising coalesced porous hybrid particles of hybrid silica having a chromatographically-enhancing pore geometry, produced by the process of
  a) prepolymerizing a mixture of one or more organoalkoxysilanes and a tetraalkoxysilane in the presence of an acid catalyst to produce a polyorganoalkoxysiloxane;
  b) preparing an aqueous suspension of the polyorganoalkoxysiloxane, the suspension further comprising a surfactant or a combination of surfactants, and gelling in the presence of a base catalyst so as to produce porous hybrid particles;
  c) modifying the pore structure of the porous hybrid particles by hydrothermal treatment; and
  d) coalescing the porous hybrid particles to form a monolith material.

Another aspect of the invention is porous inorganic/organic hybrid monolith material having a chromatographically-enhancing pore geometry, wherein said material contains a plurality of macropores sufficient to result in reduced backpressure at chromatographically-useful flow rates.

Yet another aspect of the invention is a porous inorganic/organic hybrid monolith material, having a chromatographically-enhancing pore geometry, wherein said monolith material has been surface modified by a surface modifier selected from the group consisting of an organic group surface modifier, a silanol group surface modifier, a polymeric coating surface modifier, and combinations thereof.

An additional aspect of the invention is a method of preparation of a porous inorganic/organic hybrid monolith material having a chromatographically-enhancing pore geometry, comprising the steps of
  a) forming a porous inorganic/organic monolith material and
  b) modifying the pore structure of said porous monolith material.

In yet another aspect, the present invention is a method of preparation of a porous inorganic/organic hybrid monolith material having a chromatographically-enhancing pore geometry, comprising the steps of
 a) forming a porous inorganic/organic monolith material,
 b) modifying the pore structure of said porous monolith material, and
 c) modifying the surface of said porous monolith material, wherein said monolith material has been surface modified by a surface modifier selected from the group consisting of an organic group surface modifier, a silanol group surface modifier, a polymeric coating surface modifier, and combinations thereof.

Another aspect of the invention is separations device comprising a porous inorganic/organic hybrid monolith material having a chromatographically-enhancing pore geometry, wherein said monolith material has been surface modified by a surface modifier selected from the group consisting of an organic group surface modifier, a silanol group surface modifier, a polymeric coating surface modifier, and combinations thereof.

In addition, one aspect of the invention is a method of preparation of a porous inorganic/organic hybrid monolith material having a chromatographically-enhancing pore geometry comprising
 a) preparing an aqueous solution of a mixture of one or more organoalkoxysilanes and a tetraalkoxysilane in the presence of an acid catalyst, and a surfactant or combination of surfactants to produce a polyorganoalkoxysiloxane;
 b) incubating said solution, resulting in a three-dimensional gel having a continuous, interconnected pore structure,
 c) aging the gel at a controlled pH and temperature to yield a solid monolith material,
 d) rinsing the monolith material with an aqueous basic solution at an elevated temperature,
 e) modifying the pore structure of said monolith material by hydrothermal treatment,
 f) rinsing the monolith material with water followed by a solvent exchange, and
 g) drying the monolith material at room temperature drying and at an elevated temperature under vacuum thereby preparing a porous inorganic/organic hybrid monolith material.

In yet another aspect, the present invention is porous inorganic/organic hybrid monolith material having a chromatographically-enhancing pore geometry, produced by the process of
 a) preparing an aqueous solution of a mixture of one or more organotrialkoxysilanes and a tetraalkoxysilane in the presence of an acid catalyst, and a surfactant or combination of surfactants to produce a polyorganoalkoxysiloxane;
 b) incubating said solution, resulting in a three-dimensional gel having a continuous, interconnected pore structure,
 c) aging the gel at a controlled pH and temperature to yield a solid monolith material, and
 d) rinsing the monolith material with an aqueous basic solution at an elevated temperature
 e) modifying the pore structure of said monolith material by hydrothermal treatment,
 f) rinsing the monolith material with water followed by a solvent exchange, and
 g) drying the monolith material at room temperature drying and at an elevated temperature under vacuum.

Another aspect of the invention is a porous inorganic/organic hybrid monolith material, comprising coalesced porous inorganic/organic hybrid particles having a chromatographically-enhancing pore geometry and a formula $SiO_2/[C_2H_4(SiO_{1.5})_2]_{0.25}$ wherein said hybrid particles have been surface modified with octadecyltrichlorosilane and wherein any free silanol groups remaining from said surface modification are endcapped with chlorotrimethylsilane.

Another aspect of the invention is a porous inorganic/organic hybrid monolith material comprising coalesced porous hybrid particles of hybrid silica having a chromatographically-enhancing pore geometry and a formula $SiO_2/[C_2H_4(SiO_{1.5})_2]_{0.25}$ produced by the process of
 a) prepolymerizing a 0.25/1.0 mole ratio mixture of bis(triethoxysilyl)ethane and tetraethoxysilane in the presence of 0.1 molar hydrochloric acid to produce a polyorganosiloxane;
 b) preparing an aqueous suspension of said polyorganoalkoxysiloxane, said suspension further comprising the surfactant Triton X-100, and gelling said suspension in the presence of a ammonium hydroxide so as to produce porous hybrid particles;
 c) modifying the pore structure of said porous hybrid particles by hydrothermal treatment at 155° C. for 20 h in 0.3 M tris(hydroxymethyl)aminomethane, pH adjusted to 9.80;
 d) sizing to a nominal 2 μm particle diameter;
 e) acid washing in a 1 molar hydrochloric acid solution;
 f) further surface modifying with oetadecyltrichlorosilane wherein any free silanol groups remaining from said surface modification are endcapped with chlorotrimethylsilane; and
 g) coalescing said porous hybrid particles to form a monolith material.

Another aspect of the invention is a porous inorganic/organic hybrid monolith material having a chromatographically-enhancing pore geometry and a formula $SiO_2/[CH_3SiO_{1.5}]_{0.5}$ wherein said hybrid material has been surface modified with octadecyltrichlorosilane and wherein any free silanol groups remaining from said surface modification procedure are endcapped with chlorotrimethylsilane and wherein said material contains a plurality of macropores sufficient to result in reduced backpressure at chromatographically-useful flow rates.

Another aspect of the invention is a porous inorganic/organic hybrid monolith material having a chromatographically-enhancing pore geometry and a formula $SiO_2/[CH_3SiO_{1.5}]_{0.5}$, produced by the process of
 a) preparing an aqueous solution of methyltrimethoxysilane and a tetramethoxysilane in the presence of a 0.07 molar acetic acid solution and the surfactant Pluronic P-105 or Trition X-100 to produce a polyorganoalkoxysiloxane;
 b) incubating said solution for 3 days at 45° C., resulting in a three-dimensional gel having a continuous, interconnected pore structure;
 c) aging the gel in 1 molar ammonium hydroxide at 60° C. for 3 days to yield a solid monolith material;
 d) rinsing the monolith material with water;
 e) modifying the pore structure of said monolith material by hydrothermal treatment at 155° C. for 20 h in 0.1 molar tris(hydroxymethyl)aminomethane, pH adjusted to 8.0;
 f) rinsing the monolith material with water followed by a solvent exchange;
 g) acid washing the monolith material in 1 molar hydrochloric acid for 24 hours at 98° C.;

h) rinsing the monolith material with water followed by a solvent exchange;

i) drying the monolith material at room temperature drying and at 80° C. under vacuum; and j) further surface modifying with octadecyltrichlorosilane wherein any free silanol groups remaining from said surface modification are endcapped with chlorotrimethylsilane.

Another aspect of the invention is a porous inorganic/organic hybrid monolith material having a chromatographically-enhancing pore geometry and a formula $SiO_2/[C_2H_4(SiO_{1.5})_2]_{0.25}$ wherein said hybrid material has been surface modified with octadecyltrichlorosilane and wherein any free silanol groups remaining from said surface modification procedure are endcapped with chlorotrimethylsilane and wherein said material contains a plurality of macropores sufficient to result in reduced backpressure at chromatographically-useful flow rates.

Another aspect of the invention is a porous inorganic/organic hybrid monolith material having a chromatographically-enhancing pore geometry and a formula $SiO_2/[C_2H_4(SiO_{1.5})_2]_{0.25}$, produced by the process of a) preparing an aqueous solution 1,2-bis(trimethoxysilyl)ethane and tetramethoxysilane in the presence of a 0.09 molar acetic acid solution and the surfactant Pluronic P-123 to produce a polyorganoalkoxysiloxane;

b) incubating said solution for 2 days at 45° C., resulting in a three-dimensional gel having a continuous, interconnected pore structure;

c) aging the gel in 1 molar ammonium hydroxide at 60° C. for 2 days to yield a solid monolith material;

d) rinsing the monolith material with water;

e) modifying the pore structure of said monolith material by hydrothermal treatment at 155° C. for 24 h in 0.1 M tris(hydroxymethyl)aminomethane, pH adjusted to 10.6;

f) rinsing the monolith material with water followed by a solvent exchange;

g) acid washing the monolith material in 1 molar hydrochloric acid for 24 hours at 98° C.;

h) rinsing the monolith material with water followed by a solvent exchange;

i) drying the monolith material at room temperature drying and at 80° C. under vacuum, and j) further surface modifying with octadecyltrichlorosilane wherein any free silanol groups remaining from said surface modification are endcapped with chlorotrimethylsilane.

Another aspect of the invention is a porous inorganic/organic hybrid monolith material having a chromatographically-enhancing pore geometry and a formula $SiO_2/[HOC_3H_6SiO_{1.5}]_{0.15}$ wherein said hybrid material has been surface modified with dodecylisocyante and wherein said material contains a plurality of macropores sufficient to result in reduced backpressure at chromatographically-useful flow rates.

Another aspect of the invention is a porous inorganic/organic hybrid monolith material having a chromatographically-enhancing pore geometry and a formula $SiO_2/[HOC_3H_6SiO_{1.5}]_{0.15}$, produced by the process of a) preparing an aqueous solution methacryloxypropyltrimethoxysilane and tetramethoxysilane in the presence of a 0.015 molar acetic acid solution and the surfactant Triton X-100 or Triton 405 to produce a polyorganoalkoxysiloxane;

b) incubating said solution for 3 days at 45° C., resulting in a three-dimensional gel having a continuous, interconnected pore structure;

c) aging the gel in 1 molar ammonium hydroxide at 60° C. for 3 days to yield a solid monolith material;

d) rinsing the monolith material with water;

e) modifying the pore structure of said monolith material by hydrothermal treatment at 155° C. for 24 h in 0.1 M tris(hydroxymethyl)aminomethane, pH adjusted to 10.6;

f) rinsing the monolith material with water followed by a solvent exchange;

g) acid washing the monolith material in 1 molar hydrochloric acid for 24 hours at 98° C.;

h) rinsing the monolith material with water followed by a solvent exchange;

i) drying the monolith material at room temperature drying and at 80° C. under vacuum, and j) further surface modifying with dodecylisocyanate.

DETAILED DESCRIPTION OF THE INVENTION

Figure 1:
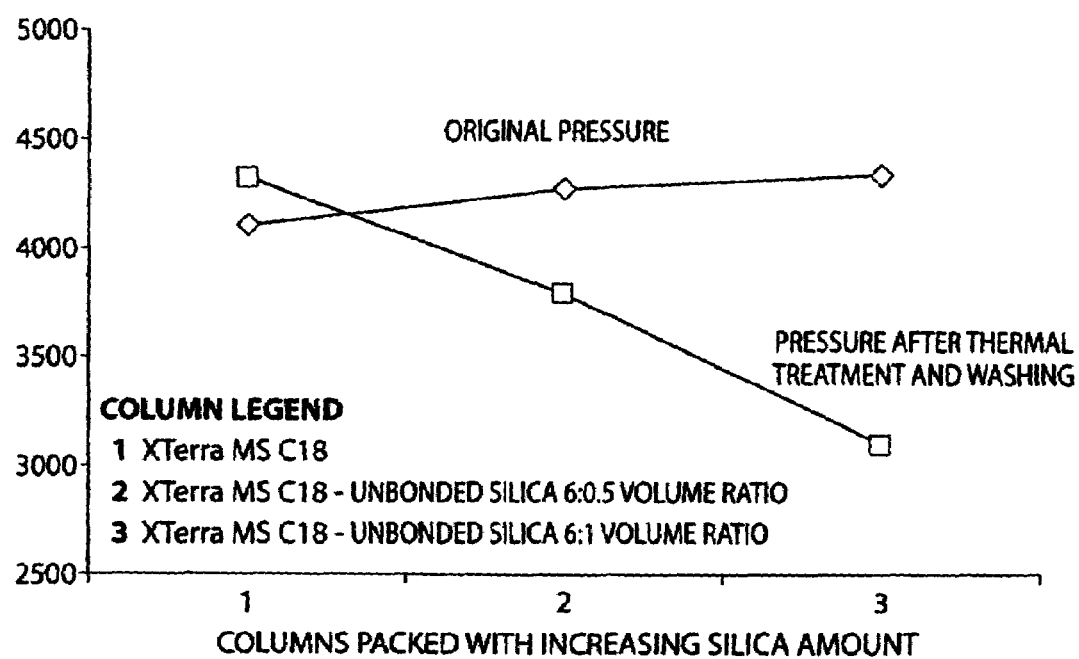
FIG. 1 depicts the pressure change before and after the sintering and washing steps described in Example 28 as a function of the amount of unbonded silica used in the origin mixture.

The present invention will be more fully illustrated by reference to the definitions set forth below.

The term "monolith" is intended to include a porous, three-dimensional material having a continuous interconnected pore structure in a single piece. A monolith is prepared, for example, by casting precursors into a mold of a desired shape. The term monolith is meant to be distinguished from a collection of individual particles packed into a bed formation, in which the end product comprises individual particles.

The terms "coalescing" and "coalesced" are intended to describe a material in which several individual components have become coherent to result in one new component by an appropriate chemical or physical process, e.g., heating. The term coalesced is meant to be distinguished from a collection of individual particles in close physical proximity, e.g., in a bed formation, in which the end product comprises individual particles.

The term "incubation" is intended to describe the time period during the preparation of the inorganic/organic hybrid monolith material in which the precursors begin to gel.

The term "aging" is intended to describe the time period during the preparation of the inorganic/organic hybrid monolith material in which a solid rod of monolithic material is formed.

The term "macropore" is intended to include pores of a material that allow liquid to flow directly through the material with reduced resistance at chromatographically-useful flow rates. For example, macropores of the present invention are intended to include, but are not limited to pores with a pore diameter larger than about 0.05 μm, pores with a pore diameter ranging from about 0.05 μm to about 100

μm, pores with a pore diameter ranging from about 0.11 μm to about 100 μm, and pores with a pore diameter ranging from about 0.5 μm to about 30 μm.

The term "chromatographically-useful flow rates" is intended to include flow rates that one skilled in the art of chromatography would use in the process of chromatography.

The language "chromatographically-enhancing pore geometry" includes the geometry of the pore configuration of the presently-disclosed porous inorganic/organic hybrid materials, which has been found to enhance the chromatographic separation ability of the material, e.g., as distinguished from other chromatographic media in the art. For example, a geometry can be formed, selected or constructed, and various properties and/or factors can be used to determine whether the chromatographic separations ability of the material has been "enhanced", e.g., as compared to a geometry known or conventionally used in the art. Examples of these factors include high separation efficiency, longer column life, and high mass transfer properties (as evidenced by, e.g, reduced band spreading and good peak shape.) These properties can be measured or observed using art-recognized techniques. For example, the chromatographically-enhancing pore geometry of the present porous inorganic/organic hybrid particles is distinguished from the prior art particles by the absence of "ink bottle" or "shell shaped" pore geometry or morphology, both of which are undesirable because they, e.g., reduce mass transfer rates, leading to lower efficiencies.

Chromatographically-enhancing pore geometry is found in hybrid materials, e.g, particles or monoliths, containing only a small population of micropores and a sufficient population of mesopores. A small population of micropores is achieved in hybrid materials when all pores of a diameter of about <34 Å contribute less than about 110 m$^2$/g to the specific surface area of the material. Hybrid materials with such a low micropore surface area give chromatographic enhancements including high separation efficiency and good mass transfer properties (as evidenced by, e.g., reduced band spreading and good peak shape). Micropore surface area is defined as the surface area in pores with diameters less than or equal to 34 Å, determined by mulitpoint nitrogen sorption analysis from the adsorption leg of the isotherm using the BJH method.

A sufficient population of mesopores is achieved in hybrid materials when all pores of a diameter of about 35 Å to about 500 Å, e.g., preferably about 60 Å to about 500 Å, e.g., even more preferably about 100 Å to about 300 Å, sufficiently contribute to the specific surface area of the material, e.g., to about 35 to about 750 m$^2$/g , e.g., preferably about 65-550 m$^2$/g, e.g., even more preferably about 100 to 350 m$^2$/g to the specific surface area of the material.

"Hybrid", i.e., as in "porous inorganic/organic hybrid particles" or "porous inorganic/organic hybrid monolith" includes inorganic-based structures wherein an organic functionality is integral to both the internal or "skeletal" inorganic structure as well as the hybrid material surface. The inorganic portion of the hybrid material may be, e.g., alumina, silica, titanium or zirconium oxides, or ceramic material; in a preferred embodiment, the inorganic portion of the hybrid material is silica. In a preferred embodiment where the inorganic portion is silica, "hybrid silica" refers to a material having the formula SiO$_2$/(R$^2_p$R$^4_q$SiO$_t$)$_n$ or SiO$_2$/[R$^6$(R$^2_r$SiO$_t$)$_m$]$_n$ wherein R$^2$ and R$^4$ are independently C$_1$-C$_{18}$ aliphatic styryl, vinyl, propanol, or aromatic moieties (which may additionally be substituted with alkyl, aryl, cyano, amino, hydroxyl, diol, nitro, ester, ion exchange or embedded polar functionalities), R$^6$ is a substituted or unsubstituted C$_1$-C$_{18}$ alkylene, alkenylene, alkynylene or arylene moiety bridging two or more silicon atoms, p and q are 0, 1 or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2, and n is a number from 0.03 to 1, more preferably, 0.1 to 1, and even more preferably 0.2 to 0.5. R$^2$ may be additionally substituted with a functionalizing group R.

The term "functionalizing group" includes organic groups which impart a certain chromatographic functionality to a chromatographic stationary phase, including, e.g., octadecyl (C$_{18}$) or phenyl. Such functionalizing groups are present in, e.g., surface modifiers such as disclosed herein which are attached to the base material, e.g., via derivatization or coating and later crosslinking, imparting the chemical character of the surface modifier to the base material. In an embodiment, such surface modifiers have the formula Z$_a$(R')$_b$Si—R, where Z=Cl, Br, I, C$_1$-C$_5$ alkoxy, dialkylamino, e.g., dimethylamino, or trifluoromethanesulfonate; a and b are each an integer from 0 to 3 provided that a+b=3; R' is a C$_1$-C$_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl.

The porous inorganic/organic hybrid particles and monolith materials possess both organic groups and silanol groups which may additionally be substituted or derivatized with a surface modifier. "Surface modifiers" include (typically) organic groups which impart a certain chromatographic functionality to a chromatographic stationary phase. Surface modifiers such as disclosed herein are attached to the base material, e.g., via derivatization or coating and later crosslinking, imparting the chemical character of the surface modifier to the base material. In one embodiment, the organic groups of the hybrid materials react to form an organic covalent bond with a surface modifier. The modifiers can form an organic covalent bond to the material's organic group via a number of mechanisms well known in organic and polymer chemistry including but not limited to nucleophilic, electrophilic, cycloaddition, free-radical, carbene, nitrene, and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds. In general, the porous inorganic/organic hybrid particles and monolith materials can be modified by an organic group surface modifier, a silanol group surface modifier, a polymeric coating surface modifier, and combinations of the aforementioned surface modifiers.

For example, silanol groups are surface modified with compounds having the formula Z$_a$(R')$_b$Si—R, where Z=Cl, Br, I, C$_1$-C$_5$ alkoxy, dialkylamino, e.g., dimethylamino, or trifluoromethanesulfonate; a and b are each an integer from 0 to 3 provided that a+b=3; R' is a C$_1$-C$_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl. In certain embodiments, the organic groups may be similarly functionalized.

The functionalizing group R may include alkyl, aryl, cyano, amino, diol, nitro, cation or anion exchange groups, or embedded polar functionalities. Examples of suitable R functionalizing groups include $C_1$-$C_{30}$ alkyl, including $C_1$-$C_{20}$, such as octyl ($C_8$), octadecyl ($C_{18}$), and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities such as disclosed in U.S. Pat. No. 5,374,755, the text of which is incorporated herein by reference. Such groups include those of the general formula

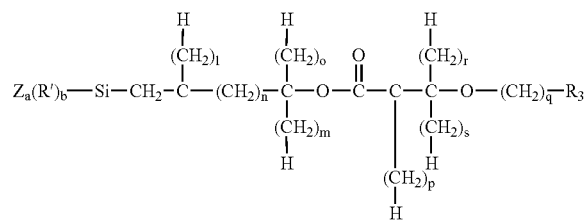

wherein l, m, o, r, and s are 0 or 1, n is 0, 1, 2 or 3 p is 0, 1, 2, 3 or 4 and q is an integer from 0 to 19; $R_3$ is selected from the group consisting of hydrogen, alkyl, cyano and phenyl; and Z, R', a and b are defined as above. Preferably, the carbamate functionality has the general structure indicated below:

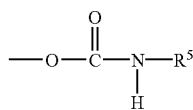

wherein $R^5$ may be, e.g., cyanoalkyl, t-butyl, butyl, octyl, dodecyl, tetradecyl, octadecyl, or benzyl. Advantageously, $R^3$ is octyl, dodecyl, or octadecyl.

In a preferred embodiment, the surface modifier may be an organotrihalosilane, such as octyltrichlorosilane or octadecyltrichlorosilane. In an additional preferred embodiment, the surface modifier may be a halopolyorganosilane, such as octyldimethylchlorosilane or octadecyldimethylchlorosilane. In certain embodiments the surface modifier is octadecyltrimethoxysilane.

In another embodiment, the hybrid material's organic groups and silanol groups are both surface modified or derivatized. In another embodiment, the hybrid materials are surface modified by coating with a polymer.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains can be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl, and the like. As used herein, the term "nitro" means —$NO_2$; the term "halogen" designates —F, —Cl, —Br or —I; the term "thiol" means SH; and the term "hydroxyl" means —OH. Thus, the term "alkylamino" as used herein means an alkyl group, as defined above, having an amino group attached thereto. Suitable alkylamino groups include groups having 1 to about 12 carbon atoms, preferably from 1 to about 6 carbon atoms. The term "alkylthio" refers to an alkyl group, as defined above, having a sulfhydryl group attached thereto. Suitable alkylthio groups include groups having 1 to about 12 carbon atoms, preferably from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, preferably 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, preferably from 1 to about 6 carbon atoms.

The term "alicyclic group" includes closed ring structures of three or more carbon atoms. Alicyclic groups include cycloparaffins or naphthenes which are saturated cyclic hydrocarbons, cycloolefins which are unsaturated with two or more double bonds, and cycloacetylenes which have a triple bond. They do not include aromatic groups. Examples of cycloparaffins include cyclopropane, cyclohexane, and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents can further comprise a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine, and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "alkyl" includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has 30 or fewer carbon atoms in its backbone, e.g., $C_1$-$C_{30}$ for straight chain or $C_3$-$C_{30}$ for branched chain. In certain embodiments, a straight chain or branched chain alkyl has 20 or fewer carbon atoms in its backbone, e.g., $C_1$-$C_{20}$ for straight chain or $C_3$-$C_{20}$ for branched chain, and more preferably 18 or fewer. Likewise, preferred cycloalkyls have from 4-10 carbon atoms in their ring structure, and more preferably have 4-7 carbon atoms in the ring structure. The term "lower alkyl" refers to alkyl groups having from 1 to 6 carbons in the chain, and to cycloalkyls having from 3 to 6 carbons in the ring structure.

Moreover, the term "alkyl" (including "lower alkyl") as used throughout the specification and claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl (benzyl).

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine, and the like. Aryl groups also include polycyclic fused aromatic groups such as naphthyl, quinolyl, indolyl, and the like. The aromatic ring can be substituted at one or more ring positions with such substituents, e.g, as described above for alkyl groups. Suitable aryl groups include unsubstituted and substituted phenyl groups. The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "amino," as used herein, refers to an unsubstituted or substituted moiety of the formula —$NR_aR_b$, in which $R_a$ and $R_b$ are each independently hydrogen, alkyl, aryl, or heterocyclyl, or $R_a$ and $R_b$, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of $R_a$ and $R_b$, is further substituted with an amino group.

The present porous inorganic/organic hybrid materials having a chromatographically-enhancing pore geometry generally have a specific surface area, as measured by $N_2$ sorption analysis, of about 50 to 800 m$^2$/g, preferably about 75 to 600 m$^2$/g, more preferably about 100 to 350 m$^2$/g. The specific pore volume of the hybrid materials is generally about 0.25 to 1.5 cm$^3$/g, preferably about 0.4 to 1.2 cm$^3$/g, more preferably about 0.5 to 1.0 cm$^3$/g. The porous inorganic/organic hybrid materials having a chromatographically-enhancing pore geometry have an average pore diameter of generally about 50 to 500 Å, preferably about 60 to 500 Å, more preferably about 100 to 300 Å. The micropore surface area is less than about 110 m$^2$/g, preferably less than about 105 m$^2$/g, more preferably less than about 80 m$^2$/g, and still more preferably less than about 50 m$^2$/g.

Porous inorganic/organic hybrid materials having a chromatographically-enhancing pore geometry may be made as described below and in the specific instances illustrated in the Examples. Porous spherical particles of hybrid silica may, in one embodiment, be prepared by a multi-step process. In the first step, one or more organoalkoxysilanes such as methyltriethoxysilane, and a tetraalkoxysilane such as tetraethoxysilane (TEOS) are prepolymerized to form a polyorganoalkoxysiloxane (POS), e.g., polyalkylalkoxysiloxane, by co-hydrolyzing a mixture of the two or more components in the presence of an acid catalyst. In the second step, the POS is suspended in an aqueous medium in the presence of a surfactant or a combination of surfactants and gelled into porous spherical particles of hybrid silica using a base catalyst. In the third step, the pore structure of the hybrid silica particles is modified by hydrothermal treatment, producing an intermediate hybrid silica product which may be used for particular purposes itself, or desirably may be further processed, as described below. The above three steps of the process allow much better control of the particle sphericity, morphology, pore volume and pore sizes than those described in the prior art, and thus provide the chromatographically-enhancing pore geometry.

In one embodiment of the invention, the surface organic groups of the hybrid silica are derivatized or modified in a subsequent step via formation of an organic covalent bond between the particle's organic group and the modifying reagent. Alternatively, the surface silanol groups of the hybrid silica are derivatized into siloxane organic groups, such as by reacting with an organotrihalosilane, e.g., octadecyltrichlorosilane, or a halopolyorganosilane, e.g., octadecyldimethylchlorosilane. Alternatively, the surface organic and silanol groups of the hybrid silica are both derivatized. The surface of the thus-prepared material is then covered by the organic groups, e.g., alkyl, embedded during the gelation and the organic groups added during the derivatization process or processes. The surface coverage by the overall organic groups is higher than in conventional silica-based packing materials, and therefore the surface concentration of the remaining silanol groups in the hybrid silica is smaller. The resulting material, used as a stationary phase for LC, shows excellent peak shape for basic analytes, and better stability to alkaline mobile phases than silica-based packing materials.

Where the prepolymerization step involves co-hydrolyzing a mixture of the two or more components in the presence of an acid catalyst, the content of the organoalkoxysilane, e.g., organotrialkoxysilane, can be varied, e.g., from about 0.03 to about 1.0 mole per mole, or more preferably, about 0.2 to about 0.5 mole per mole, of the tetraalkoxysilane. The amount of the water used for the hydrolysis can be varied, e.g., from about 1.10 to about 1.35 mole per mole of the silane. The silane, water and the ethanol mixture, in the form of a homogeneous solution, is stirred and heated to reflux under a flow of argon. After it is refluxed for a time sufficient to prepolymerize to form polyorganoalkoxysiloxane (POS), e.g., polyalkylalkoxysiloxane, the solvent and the side product, mainly ethanol, is distilled off from the reaction mixture. Thereafter, the residue is heated at an elevated temperature, e.g., in the range of about 120 to 140° C. under an atmosphere of argon for a period of time, e.g., about 1.5 to 16 h. The residue is further heated at this temperature, e.g., for about 1 to 3 h under reduced pressure, e.g., about $10^{-2}$ to $10^{-3}$ torr, to remove any volatile species.

In the second step, the POS is suspended into fine beads in a solution containing water and ethanol at 55° C. by agitation. The volume percent of ethanol in the solution is varied from 10 to 20%. A non-ionic surfactant such as Triton X-100 or Triton X-45 is added into the suspension as the suspending agent. Alternatively a mixture of Triton X-45 and low levels of sodium dodecyl sulfate (SDS) or tris (hydroxymethyl)aminomethane lauryl sulfate (TDS) is added into the suspension as the suspending agent. The surfactants, e.g., alkylphenoxypolyethoxyethanol, are believed to be able to orient at the hydrophobic/hydrophilic interface between the POS beads and the aqueous phase to stabilize the POS beads. The surfactants are also believed to enhance the concentration of water and the base catalyst on the surface of the POS beads during the gelation step, through their hydrophilic groups, which induces the gelling of the POS beads from the surface towards the center. Use of surfactants to modulate the surface structure of the POS beads stabilizes the shape of the POS beads throughout the gelling process, and minimizes or suppresses formation of particles having irregular shapes, e.g., "shell shaped", and inhomogeneous morphology.

It is also possible to suspend a solution containing POS and toluene in the aqueous phase, instead of POS alone. The toluene, which is insoluble in the aqueous phase, remains in the POS beads during the gelation step and functions as a porogen. By controlling the relative amount of toluene in the POS/toluene solution, the pore volume of the final hybrid silica can be more precisely controlled. This allows the preparation of hybrid silica particles having large pore volume, e.g., 0.8-1.2 cm$^3$/g.

The gelation step is initiated by adding a basic catalyst, e.g., ammonium hydroxide into the POS suspension agitated at 55° C. Thereafter, the reaction mixture is agitated at the same temperature to drive the reaction to completion. Ammonium hydroxide is preferred because bases such as sodium hydroxide are a source of unwanted cations, and ammonium hydroxide is easier to remove in the washing step. The thus-prepared hybrid silica is filtered and washed with water and methanol that are free of ammonium ions, then dried.

In one embodiment, the pore structure of the as-prepared hybrid material is modified by hydrothermal treatment, which enlarges the openings of the pores as well as the pore diameters, as confirmed by nitrogen ($N_2$) sorption analysis. The hydrothermal treatment is performed by preparing a slurry containing the as-prepared hybrid material and a solution of organic base in water, heating the slurry in an autoclave at an elevated temperature, e.g., about 143 to 168° C., for a period of about 6 to 28 h. The pH of the slurry can be adjusted to be in the range of about 8.0 to 10.7 using concentrated acetic acid. The concentration of the slurry is in the range of about 1 g hybrid material per 5 to 10 mL of the base solution. The thus-treated hybrid material is filtered, and washed with water until the pH of the filtrate reaches about 7, washed with acetone, then dried at about 100° C. under reduced pressure for about 16 h. The resultant hybrid materials show average pore diameters in the range of about 100-300 Å. The surface of the hydrothermally treated hybrid material may be modified in a similar fashion to that of the hybrid material that is not modified by hydrothermal treatment as described in the present invention.

Moreover, the surface of the hydrothermally treated hybrid silica contains organic groups, which can be derivatized by reacting with a reagent that is reactive towards the hybrid materials' organic group. For example, vinyl groups on the material can be reacted with a variety of olefin reactive reagents such as bromine ($Br_2$), hydrogen ($H_2$), free radicals, propagating polymer radical centers, dienes, and the like. In another example, hydroxyl groups on the material can be reacted with a variety of alcohol reactive reagents such as isocyanates, carboxylic acids, carboxylic acid chlorides, and reactive organosilanes as described below. Reactions of this type are well known in the literature, see, e.g. March, J. "Advanced Organic Chemistry," $3^{rd}$ Edition, Wiley, New York, 1985; Odian, G. "The Principles of Polymerization," $2^{nd}$ Edition, Wiley, New York, 1981; the texts of which are incorporated herein by reference.

In addition, the surface of the hydrothermally treated hybrid silica also contains silanol groups, which can be derivatized by reacting with a reactive organosilane. The surface derivatization of the hybrid silica is conducted according to standard methods, for example by reaction with octadecyltrichlorosilane or octadecyldimethylchlorosilane in an organic solvent under reflux conditions. An organic solvent such as toluene is typically used for this reaction. An organic base such as pyridine or imidazole is added to the reaction mixture to catalyze the reaction. The product of this reaction is then washed with water, toluene and acetone and dried at about 80° C. to 100° C. under reduced pressure for about 16 h. The resultant hybrid silica can be further reacted with a short-chain silane such as trimethylchlorosilane to endcap the remaining silanol groups, by using a similar procedure described above.

More generally, the surface of the hybrid silica materials may be surface modified with a surface modifier, e.g., $Z_a(R')_b Si$—R, where Z=Cl, Br, I, $C_1$-$C_5$ alkoxy, dialkylamino, e.g., dimethylamino, or trifluoromethanesulfonate; a and b are each an integer from 0 to 3 provided that a+b=3; R' is a $C_1$-$C_6$ straight, cyclic or branched alkyl group, and R is a functionalizing group. R' may be, e.g., methyl, ethyl, propyl, isopropyl, butyl, t-butyl, sec-butyl, pentyl, isopentyl, hexyl or cyclohexyl; preferably, R' is methyl.

The functionalizing group R may include alkyl, alkenyl, alkynyl, aryl, cyano, amino, diol, nitro, cation or anion exchange groups, or alkyl or aryl groups with embedded polar functionalities. Examples of suitable R functionalizing groups include $C_1$-$C_{30}$ alkyl, including $C_1$-$C_{20}$, such as octyl ($C_8$), octadecyl ($C_{18}$), and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities such as disclosed in U.S. Pat. No. 5,374,755, the text of which is incorporated herein by reference and as detailed hereinabove. In a preferred embodiment, the surface modifier may be an organotrihalosilane, such as octyltrichlorosilane or octadecyltrichlorosilane. In an additional preferred embodiment, the surface modifier may be a halopolyorganosilane, such as octyldimethylchlorosilane or octadecyldimethylchlorosilane. Advantageously, R is octyl or octadecyl.

The surface of the hybrid silica materials may also be surface modified by coating with a polymer. Polymer coatings are known in the literature and may be provided generally by polymerization or polycondensation of physisorbed monomers onto the surface without chemical bonding of the polymer layer to the support (type I), polymerization or polycondensation of physisorbed monomers onto the surface with chemical bonding of the polymer layer to the support (type II), immobilization of physisorbed prepolymers to the support (type III), and chemisorption of presynthesized polymers onto the surface of the support (type IV). see, e.g., Hanson et al., *J. Chromat.* A656 (1993) 369-380, the text of which is incorporated herein by reference. As noted above, coating the hybrid material with a polymer may be used in conjunction with various surface modifications described in the invention. In a preferred embodiment, Sylgard® is used as the polymer.

Another embodiment of the invention is a porous inorganic/organic hybrid monolith material. The hybrid monolith materials of the current invention may be indirectly prepared by coalescing the inorganic/organic hybrid particles of the invention or may be directly prepared from inorganic and organic precursors. Because of the novel processes of the invention, the hybrid monolith material of the invention have a high surface coverage of organic groups, in addition to a chromatographically-enhancing pore geometry. Furthermore, by incorporation of the organic moieties in the silica backbone, the hydrophobic properties of the hybrid monolith material, as is seen in the hybrid particles of the invention, can be tailored to impart significantly improved alkaline stability.

Porous inorganic/organic hybrid monolith materials may be made as described below and in the specific instances illustrated in the Examples. In a preferred embodiment, the porous spherical particles of hybrid silica of the invention may be used as prepared by the process noted above, without further modification. These hybrid particles are mixed with a second material, e.g., unbonded silica, and packed into a container, e.g., a column. After packing is complete, the mixture is coalesced, e.g., sintered, and the second material is subsequently removed by a washing step. The resulting monolith material is further processed, e.g., rinsed with a solvent, to result in the hybrid monolith material.

Alternatively, the monolith material may be prepared directly by a sol-gel process. Current sol-gel processes for inorganic monolith materials require a calcination step where the temperature reaches above 400° C. This process is not suitable for hybrid monolith materials since the organic moieties can be destroyed. Furthermore, silanol groups can be irreversibly condensed above 400° C., leaving behind more acidic silanols. As a result, some analytes, particularly basic analytes, can suffer from increased retention, excessive tailing and irreversible adsorption. The unique sol-gel process of the current invention of preparing the inorganic/organic hybrid monolith materials at low temperature preserves the organic moieties in the monolith material and precludes irreversible silanol condensation.

The general process for directly preparing an inorganic/organic hybrid monolith material in a single step from inorganic and organic precursors can be characterized by the following process.

First, a solution is prepared containing an aqueous acid, e.g., acetic, with a surfactant, an inorganic precursor, e.g., tetraalkoxysilane, and an organic precursor, e.g., a organoalkoxysilane, e.g., organotrialkoxysilane. The range of acid concentration is from about 0.1 mM to 500 mM, more preferably from about 10 mM to 150 mM, and still more preferably from about 50 mM to 120 mM. The range of surfactant concentration is between about 3% and 15% by weight, more preferably between about 7 and 12% by weight, and still more preferably between about 8% to 10% by weight. Furthermore, the range of the total silane concentration, e.g., methyltrimethoxysilane and tetramethoxysilane, employed in the process is kept below about 5 g/ml, more preferably below 2 g/ml, and still more preferably below 1 g/ml.

The sol solution is then incubated at a controlled temperature, resulting in a three-dimensional gel having a continuous, interconnected pore structure. The incubation temperature range is between about the freezing point of the solution and 90° C., more preferably between about 20° C. and 70° C., still more preferably between about 35° C. and 60° C. The gel is aged at a controlled pH, preferably about pH 2-3, and temperature, preferably about 20-70° C., more preferably about 35 to 60° C., for about 5 hours to about 10 days, more preferably from about 10 hours to about 7 days, and still more preferably from about 2 days to about 5 days, to yield a solid monolith material.

In order to further gel the hybrid material and to remove surfactant, the monolith material is rinsed with an aqueous basic solution, e.g., ammonium hydroxide, at an temperature of about 0° C. to 80° C., more preferably between about 20° C. and 70° C., and still more preferably between about 40° C. and 60° C. Additionally, in certain embodiments, the concentration of base is between about $10^{-5}$ N and 1 N, more preferably between about $10^{-4}$ N and 0.5 N, and still more preferably between about $10^{-3}$ N and 0.1 N. The monolith material is rinsed for about 1 to 6 days, more preferably for about 1.5 to 4.5 days, the still more preferably for about 2 to 3 days.

In addition, the monolith material may undergo hydrothermal treatment in a basic solution at an elevated temperature, e.g., in an autoclave, to improve the monolith material's pore structure. The preferred pH of the hydrothermal treatment is between about 7.0 and 12.0, more preferably between about 7.3 and 11.0, and still more preferably between about 7.5 and 10.6. The temperature of the hydrothermal treatment is between about 110° C. and 180° C., more preferably between about 120° C. and 160° C., and still more preferably between about 130° C. and 155° C. The monolith material is then rinsed with water followed by a solvent exchange with methanol, ethanol, acetonitrile, tetrahydrofuran, or hexane, and room temperature drying. The monolith material is then dried at about 70 to 120° C., and preferably at about 100° C. under vacuum for about 16-24 hours.

In a subsequent step, the surface organic groups of the hybrid monolith material, prepared directly or indirectly, are optionally derivatized or modified via formation of a covalent bond between the monolith material's organic and/or silanol group and the modifying reagent, optionally including coating with a polymer, as is described for the hybrid particles.

The porous inorganic/organic hybrid monolith materials of the current invention have a wide variety of end uses in the separation sciences, such as materials for chromatographic columns (wherein such columns may have improved stability to alkaline mobile phases and reduced peak tailing for basic analytes), thin layer chromatographic (TLC) plates, filtration membranes, microtiter plates, scavenger resins, solid phase organic synthesis supports, and the like, having a stationary phase that includes porous inorganic/organic hybrid materials having a chromatographically-enhancing pore geometry and porous inorganic/organic hybrid monolith materials of the present invention. The stationary phase may be introduced by packing, coating, impregnation, cladding, wrapping, or other art-recognized techniques, etc., depending on the requirements of the particular device. In a particularly advantageous embodiment, the chromatographic device is a chromatographic column, such as commonly used in HPLC.

EXAMPLES

The present invention may be further illustrated by the following non-limiting examples describing the preparation of porous inorganic/organic hybrid particles and monolith materials, and their use.

Example 1

An organoalkoxysilane and tetraethoxysilane (all from Gelest Inc., Tullytown, Pa.) are mixed with ethanol (HPLC grade, J.T. Baker, Phillipsburgh, N.J.) and 0.1 N hydrochloric acid (Aldrich Chemical, Milwaukee, Wis.) in a flask. The resulting solution is agitated and refluxed for 16 h in an atmosphere of argon or nitrogen. Ethanol and methanol (if applicable) are removed from the flask via distillation at atmospheric pressure. Residual alcohol and volatile species are removed by heating at 115-140° C. for 1-2 h in a sweeping stream of inert gas or by heating at 125° C. under reduced pressure for 1-2 h. The resulting polyorganoalkoxysiloxanes are colorless viscous liquids. The product numbers and the respective chemical formula of the organotrialkoxysilanes used in the copolymerization with tetraethoxysilane are listed in Table 1. The specific amounts of starting materials used to prepare these products are listed in Table 2.

TABLE 1

| Used in Products | Organoalkoxysilane Chemical Formula | Organic Group Name |
|---|---|---|
| 1a, b, c | $CH_3Si(OCH_2CH_3)_3$ | methyl |
| 1d | $C_2H_5Si(OCH_2CH_3)_3$ | ethyl |
| 1e | $C_6H_5Si(OCH_2CH_3)_3$ | phenyl |
| 1f, g, h, i, j | $(CH_3CH_2O)_3Si(CH_2)_2Si(OCH_2CH_3)_3$ | ethane bridge |
| 1k, l | $H_2C=CHSi(OCH_2CH_3)_3$ | vinyl |
| 1m, n, o | $H_2C=C(CH_3)CO_2C_3H_6Si(OCH_3)_3$ | methacryloxypropyl |
| 1p, q | $H_2C=CHC_6H_4C_2H_4Si(OCH_3)_3$ | styrylethyl |

TABLE 2

| Product | Mole Ratio: Organosilane/ TEOS | Organotri- alkoxysilane (g) | TEOS (g) | 0.1 N HCl (g) | Ethanol (mL) |
|---|---|---|---|---|---|
| 1a | 0.20 | 137 | 802 | 109 | 400 |
| 1b | 0.35 | 249 | 832 | 116 | 300 |
| 1c | 0.50 | 534 | 1248 | 203 | 450 |
| 1d | 0.25 | 116 | 503 | 65 | 300 |
| 1e | 0.25 | 113 | 392 | 53 | 300 |
| 1f | 0.037 | 19 | 297 | 37 | 218 |
| 1g | 0.125 | 59 | 278 | 39 | 218 |
| 1h | 0.25 | 106 | 250 | 40 | 218 |
| 1i | 0.50 | 177 | 208 | 43 | 218 |
| 1j | 1.0 | 266 | 156 | 46 | 218 |
| 1k | 0.25 | 160 | 875 | 119 | 253 |
| 1l | 0.50 | 799 | 1750 | 297 | 736 |
| 1m | 0.10 | 179 | 1500 | 178 | 463 |
| 1n | 0.125 | 373 | 2500 | 304 | 788 |
| 1o | 0.25 | 671 | 2250 | 304 | 788 |
| 1p | 0.033 | 15 | 355 | 42 | 99 |
| 1q | 0.10 | 20 | 156 | 19 | 47 |

Example 2

A mixture of a surfactant (Triton X-45 or Triton X-100, Aldrich Chemical, Milwaukee, Wis.), ethanol (anhydrous, J.T. Baker, Phillipsburgh, N.J.), and deionized water was heated at 55° C. for 0.5 h, resulting in a white liquid. Under rapid agitation, a solution of toluene (HPLC grade, J.T. Baker, Phillipsburgh, N.J.) in polyorganalkoxysiloxane (selected from Table 2) was added into the ethanol/water/Triton mixture, and emulsified in the aqueous phase. Thereafter, 30% $NH_4OH$ (VWR, Bridgeport, N.J.) was added into the emulsion to gel the emulsion beads. Suspended in the solution, the gelled product was transferred to a flask and stirred at 55° C. for 16 h. The resulting spherical, porous, hybrid inorganic/organic particles were collected on 0.5 μm filtration paper and washed successively with water and methanol (HPLC grade, J.T. Baker, Phillipsburgh, N.J.). The products were then dried in a vacuum oven at 80° C. overnight. Specific amounts of starting materials used to prepare these products are listed in Table 3. $^{13}C$ and $^{29}Si$ CPMAS NMR spectra of the products are consistent with the assigned products with respect to organic group structure and ratio of organic/inorganic units. For products, 2q, 2r, and 2s, approximately 30% of the methacryoxypropyl ester groups were observed to hydrolyze to the corresponding 3-hydroxypropyl organic unit and methacrylic acid, where the acid was removed in the wash steps.

Example 3

A mixture of Triton X-45 and sodium dodecylsulfate (SDS) (J.T. Baker, Phillipsburgh, N.J.) or tris(hydroxymethyl)aminomethane lauryl sulfate (TDS) (Fluka Chemical, Milwaukee, Wis.) was used to prepare spherical, porous, hybrid inorganic/organic particles made from the polyorganoalkoxysiloxanes consisting of bis(triethoxysilyl)ethane/TEOS molar ratios of 0.5 and 1.0 (Table 2, products 1i and 1j, respectively). The procedure was the same as described for Example 2, except that the 30% $NH_4OH$ was added to the emulsion after transfer from the emulsifier reactor to the stirred reaction flask. The molar ratio of Triton X-45/SDS or TDS was 1.2/1.0. The specific amounts of reagents used to prepare these products (2l, 2m, 2n) are listed in Table 3.

TABLE 3

| Product | Polyorgano- alkoxysilane Feedstock | Mole Ratio: Organosiloxane/$SiO_2$ in product | Polyorgano- alkoxysilane (g) | Toluene (mL) | Ethanol (mL) | Water (mL) | Surfactant Type | Surfactant (g) | Ammonium Hydroxide (mL) |
|---|---|---|---|---|---|---|---|---|---|
| 2a | 1a | 0.20 | 240 | 0 | 240 | 960 | X-100 | 20 | 150 |
| 2b | 1c | 0.50 | 240 | 0 | 240 | 960 | X-100 | 20 | 150 |

TABLE 3-continued

| Product | Polyorgano-alkoxysilane Feedstock | Mole Ratio: Organosiloxane/SiO$_2$ in product | Polyorgano-alkoxysilane (g) | Toluene (mL) | Ethanol (mL) | Water (mL) | Surfactant Type | Surfactant (g) | Ammonium Hydroxide (mL) |
|---|---|---|---|---|---|---|---|---|---|
| 2c | 1a | 0.20 | 249 | 30 | 285 | 1200 | X-45 | 24 | 190 |
| 2d | 1b | 0.35 | 249 | 30 | 285 | 1200 | X-45 | 24 | 190 |
| 2e | 1c | 0.50 | 249 | 30 | 285 | 1200 | X-45 | 24 | 190 |
| 2f | 1c | 0.50 | 249 | 60 | 285 | 1200 | X-45 | 24 | 190 |
| 2g | 1d | 0.25 | 240 | 0 | 240 | 960 | X-100 | 20 | 150 |
| 2h | 1e | 0.25 | 240 | 0 | 240 | 960 | X-100 | 20 | 150 |
| 2i | 1f | 0.037 | 58 | 7.0 | 66 | 280 | X-45 | 5.6 | 44 |
| 2j | 1g | 0.125 | 500 | 70 | 660 | 2800 | X-45 | 56 | 440 |
| 2k | 1h | 0.25 | 580 | 70 | 660 | 2800 | X-45 | 56 | 440 |
| 2l | 1i | 0.50 | 58 | 7.0 | 66 | 280 | X-45/SDS | 5.6 | 44 |
| 2m | 1i | 0.50 | 58 | 7.0 | 66 | 280 | X-45/TDS | 5.6 | 44 |
| 2n | 1j | 1.0 | 58 | 7.0 | 66 | 280 | X-45/SDS | 5.6 | 44 |
| 2o | 1k | 0.25 | 436 | 53 | 482 | 2100 | X-45 | 42 | 362 |
| 2p | 1l | 0.50 | 479 | 58 | 530 | 2310 | X-45 | 46 | 398 |
| 2q | 1m | 0.10 | 479 | 58 | 530 | 2310 | X-45 | 46 | 398 |
| 2r | 1n | 0.125 | 53 | 6.5 | 59 | 257 | X-45 | 5.2 | 44 |
| 2s | 1o | 0.25 | 53 | 6.5 | 59 | 257 | X-45 | 5.2 | 44 |
| 2t | 1p | 0.033 | 202 | 25 | 223 | 973 | X-45 | 19.5 | 168 |
| 2u | 1q | 0.10 | 53 | 6.6 | 59 | 257 | X-45 | 5.1 | 44 |

Example 4

Spherical, porous, hybrid inorganic/organic particles of Examples 2 and 3 were mixed with tris(hydroxymethyl) aminomethane (TRIS, Aldrich Chemical, Milwaukee, Wis.) in water, yielding a slurry. The pH of the slurry was adjusted as necessary to between 8 and 10.7 by adding concentrated acetic acid. The resultant slurry was then enclosed in a stainless steel autoclave and heated to between 140 and 165° C. for 20 h. After the autoclave cooled to room temperature the product was filtered and washed repeatedly using water and methanol (HPLC grade, J.T. Baker, Phillipsburgh, N.J.), and then dried at 80° C. under vacuum for 16 h. Specific hydrothermal conditions (mL of TRIS solution/gram of hybrid silica particle, concentration and pH of initial TRIS solution, reaction temperature) used to prepare these products are listed in Table 4. The specific surface areas (SSA), specific pore volumes (SPV) and the average pore diameters (APD) of these materials are measured using the multi-point N$_2$ sorption method and are listed in Table 5. The specific surface area was calculated using the BET method, the specific pore volume was the single point value determined for P/P$_0$>0.98, and the average pore diameter was calculated from the desorption leg of the isotherm using the BJH method. We also determined the micropore surface area (MPA), which we defined as the surface area in pores with diameters less than or equal to 34 Å, determined from the adsorption leg of the isotherm using the BJH method.

Methacryloxypropyl hybrid materials (e.g., 3q, 3r, 3s) were converted into 3-hydroxypropyl hybrid materials via hydrolysis of the ester bond during hydrothermal treatment. Conversion of the ester into the alcohol group was observed by a decrease in the % C of the particles before vs. after treatment. $^{13}$C CPMAS NMR spectra of the hydrothermally treated particles detect 3-hydroxypropyl groups only, however, FTIR spectra of the particles indicate the existence of a carbonyl containing group as evidenced by a weak band at 1695 cm$^{-1}$. Higher concentrations of TRIS solution were required to modify the pore structure of these particles because a portion of the base was sequestered as the methacrylic acid salt. The composition of methacryloxypropyl particles post hydrothermal treatment was relabeled to 3-hydroxypropyl. All post hydrothermal compositions were confirmed using % CHN, FTIR, $^{13}$C and $^{29}$Si CPMAS NMR spectroscopy.

TABLE 4

| | | | TRIS Conditions | | | |
|---|---|---|---|---|---|---|
| Product | Precursor | Prehydrothermal Composition of Hybrid Materials | Amount (mL/g) | Conc. (Molarity) | pH | Temp. (° C.) |
| 3a | 2a | SiO$_2$/(CH$_3$SiO$_{1.5}$)$_{0.2}$ | 10 | 0.10 | 8.0 | 143 |
| 3b | 2b | SiO$_2$/(CH$_3$SiO$_{1.5}$)$_{0.2}$ | 10 | 0.10 | 8.1 | 143 |
| 3c | 2c | SiO$_2$/(CH$_3$SiO$_{1.5}$)$_{0.2}$ | 10 | 0.10 | 8.4 | 155 |
| 3d | 2d | SiO$_2$/(CH$_3$SiO$_{1.5}$)$_{0.35}$ | 10 | 0.10 | 8.0 | 143 |
| 3e | 2e | SiO$_2$/(CH$_3$SiO$_{1.5}$)$_{0.5}$ | 10 | 0.10 | 8.3 | 143 |
| 3f1 | 2f1 | SiO$_2$/(CH$_3$SiO$_{1.5}$)$_{0.5}$ | 10 | 0.10 | 8.3 | 143 |
| 3f2 | 2f2 | SiO$_2$/(CH$_3$SiO$_{1.5}$)$_{0.5}$ | 10 | 0.10 | 8.75 | 148 |
| 3f3 | 2f3 | SiO$_2$/(CH$_3$SiO$_{1.5}$)$_{0.5}$ | 10 | 0.10 | 9.0 | 163 |
| 3g | 2g | SiO$_2$/(C$_2$H$_5$SiO$_{1.5}$)$_{0.25}$ | 10 | 0.10 | 8.3 | 143 |
| 3i | 2i | SiO$_2$/[C$_2$H$_4$(SiO$_{1.5}$)$_2$]$_{0.037}$ | 5 | 0.10 | 10.2 | 165 |
| 3j | 2j | SiO$_2$/[C$_2$H$_4$(SiO$_{1.5}$)$_2$]$_{0.125}$ | 5 | 0.10 | 10.0 | 165 |
| 3k | 2k | SiO$_2$/[C$_2$H$_4$(SiO$_{1.5}$)$_2$]$_{0.25}$ | 5 | 0.30 | 10.0 | 165 |
| 3l | 2l | SiO$_2$/[C$_2$H$_4$(SiO$_{1.5}$)$_2$]$_{0.5}$ | 5 | 0.30 | 10.2 | 165 |
| 3m | 2m | SiO$_2$/[C$_2$H$_4$(SiO$_{1.5}$)$_2$]$_{0.5}$ | 5 | 0.30 | 10.2 | 165 |
| 3n | 2n | SiO$_2$/[C$_2$H$_4$(SiO$_{1.5}$)$_2$]$_{1.0}$ | 5 | 0.30 | 10.2 | 165 |

TABLE 4-continued

| Product | Precursor | Prehydrothermal Composition of Hybrid Materials | TRIS Conditions | | | |
|---|---|---|---|---|---|---|
| | | | Amount (mL/g) | Conc. (Molarity) | pH | Temp. (° C.) |
| 3o | 2o | $SiO_2/(H_2C=CHSiO_{1.5})_{0.25}$ | 5 | 0.10 | 8.5 | 155 |
| 3p1 | 2p | $SiO_2/(H_2C=CHSiO_{1.5})_{0.5}$ | 5 | 0.10 | 8.5 | 155 |
| 3p2 | 2p | $SiO_2/(H_2C=CHSiO_{1.5})_{0.5}$ | 5 | 0.10 | 10.2 | 155 |
| 3q | 2q | $SiO_2/[H_2C=C(CH_3)CO_2C_3H_6SiO_{1.5}]_{0.10}$ | 5 | 0.75 | 10.7 | 155 |
| 3r | 2r | $SiO_2/[H_2C=C(CH_3)CO_2C_3H_6SiO_{1.5}]_{0.125}$ | 5 | 0.75 | 10.7 | 155 |
| 3t | 2t | $SiO_2/(H_2C=CHC_6H_4C_2H_4SiO_{1.5})_{0.033}$ | 5 | 0.10 | 9.6 | 155 |
| 3u | 2u | $SiO_2/(H_2C=CHC_6H_4C_2H_4SiO_{1.5})_{0.10}$ | 5 | 0.75 | 10.7 | 155 |

TABLE 5

| Product | Post-hydrothermal Composition of Hybrid Materials | $N_2$ Sorption Data | | | |
|---|---|---|---|---|---|
| | | SSA ($m^2/g$) | SPV (cc/g) | APD (Å) | MPA ($m^2/g$) |
| 3a | $SiO_2/(CH_3SiO_{1.5})_{0.2}$ | 130 | 0.41 | 103 | 72 |
| 3b | $SiO_2/(CH_3SiO_{1.5})_{0.2}$ | 151 | 0.71 | 159 | 14 |
| 3c | $SiO_2/(CH_3SiO_{1.5})_{0.2}$ | 135 | 0.67 | 173 | 15 |
| 3d | $SiO_2/(CH_3SiO_{1.5})_{0.35}$ | 160 | 0.72 | 139 | 14 |
| 3e | $SiO_2/(CH_3SiO_{1.5})_{0.5}$ | 225 | 0.90 | 123 | 21 |
| 3f1 | $SiO_2/(CH_3SiO_{1.5})_{0.5}$ | 188 | 0.70 | 125 | 15 |
| 3f2 | $SiO_2/(CH_3SiO_{1.5})_{0.5}$ | 155 | 0.69 | 148 | 15 |
| 3f3 | $SiO_2/(CH_3SiO_{1.5})_{0.5}$ | 125 | 0.62 | 168 | 13 |
| 3g | $SiO_2/(C_2H_5SiO_{1.5})_{0.25}$ | 267 | 0.94 | 139 | 53 |
| 3i | $SiO_2/[C_2H_4(SiO_{1.5})_2]_{0.037}$ | 162 | 0.52 | 122 | 28 |
| 3j | $SiO_2/[C_2H_4(SiO_{1.5})_2]_{0.125}$ | 127 | 0.81 | 238 | 31 |
| 3k | $SiO_2/[C_2H_4(SiO_{1.5})_2]_{0.25}$ | 162 | 0.52 | 122 | 28 |
| 3l | $SiO_2/[C_2H_4(SiO_{1.5})_2]_{0.5}$ | 122 | 0.48 | 133 | 23 |
| 3m | $SiO_2/[C_2H_4(SiO_{1.5})_2]_{0.5}$ | 155 | 0.45 | 101 | 34 |
| 3n | $SiO_2/[C_2H_4(SiO_{1.5})_2]_{1.0}$ | 150 | 0.45 | 107 | 32 |
| 3o | $SiO_2/(H_2C=CHSiO_{1.5})_{0.25}$ | 143 | 0.73 | 194 | 26 |
| 3p1 | $SiO_2/(H_2C=CHSiO_{1.5})_{0.5}$ | 219 | 0.65 | 141 | 101 |
| 3p2 | $SiO_2/(H_2C=CHSiO_{1.5})_{0.5}$ | 165 | 0.54 | 155 | 94 |
| 3q | $SiO_2/[HOC_3H_6SiO_{1.5}]_{0.10}$ | 324 | 1.04 | 113 | 23 |
| 3r | $SiO_2/[HOC_3H_6SiO_{1.5}]_{0.125}$ | 353 | 0.76 | 79 | 50 |
| 3t | $SiO_2/(H_2C=CHC_6H_4C_2H_4SiO_{1.5})_{0.033}$ | 153 | 0.62 | 153 | 31 |
| 3u | $SiO_2/(H_2C=CHC_6H_4C_2H_4SiO_{1.5})_{0.10}$ | 193 | 0.55 | 102 | 58 |

Example 5

The particles of hybrid silica prepared according to Example 4 were separated by particle size into ~3, ~5, and ~7 μm fractions. The particles were then dispersed in a 1 molar hydrochloric acid solution (Aldrich Chemical) for 20 h at 98° C. After the acid treatment was completed, the particles were washed with water to a neutral pH, followed by acetone (HPLC grade, J.T. Baker, Phillipsburgh, N.J.). The particles were then dried at 80° C. under vacuum for 16 h.

Example 6

Vinyl hybrid silica particles (product 3p1 of Example 5) were sized and acid washed according to Example 5. A 20 g amount of the 5 μm vinyl hybrid particles were added onto an 80 mm OD watch glass and placed inside a 90×170 mm (H×OD) crystallizing dish. Fuming bromine, 5 mL (Aldrich Chemical), was then added around the outside diameter of the watch glass, and the crystallization dish was covered with an inverted 100×190 mm (H×OD) crystallization dish. The bromination reaction was performed at ambient temperature for 18 h. Excess bromine was subsequently removed, and the material was washed exhaustively with methylene chloride (HPLC grade, J.T. Baker), water, and again with methylene chloride. The brominated particles were then dried at 80° C. under vacuum for 16 h. Incorporation of 18.6% bromine was measured by combustion-titration analysis (Galbraith Laboratories, Knoxville, Tenn.), and 20% of the vinyl groups were converted into the dibromoethane analog as determined by $^{13}$C CPMAS NMR spectroscopy.

Example 7

Vinyl hybrid silica particles (product 3p1 of Example 5) were sized and acid washed according to Example 5. A 50 g amount of the 5 μm vinyl hybrid particles was combined with 15.0 g p-toluenesulfonhydrazide (Aldrich Chemical), 14.3 g tripropylamine (Aldrich Chemical), and 300 mL o-xylene (Aldrich Chemical) in a 500 mL three-neck round-bottom flask. The reaction mixture was heated to 140° C. for 6 h. and was then cooled to room temperature (30° C.). The flask was recharged with the same amount of p-toluene-sulfonhydrazide and tripropylamine, and the reaction mixture was reheated to 140° C. for another 16 h. The particles were then washed exhaustively with toluene, acetone, acetone/water (50/50, v/v), and acetone (all solvents HPLC grade, J.T. Baker). The washed particles were then dried at 80° C. under vacuum for 16 h. The dried particles were reacted an additional 7 successive times, as described above, to afford a 1/20 ratio of unreacted vinyl groups to hydroge-

Example 8

Vinyl hybrid silica particles (product 3p1 of Example 5) were sized and acid washed according to Example 5. A 10 g amount of the 5 μm vinyl hybrid particles was combined with 62 g of 4,4'-azobis(4-cyanovaleric acid) (Aldrich Chemical) in 125 mL of a methanol/water (50/50, v/v) solution. The suspension was deoxygenated by bubbling argon gas through it for 1 h, after which an argon blanket was maintained over the suspension. The suspension was then heated to 70° C. for 20 h and subsequently cooled to room temperature. The mixture was transferred to a filter apparatus and washed exhaustively with toluene, acetone/water (50/50, v/v), and acetone (all solvents HPLC grade, J.T. Baker). The washed particles were then dried at 80° C. under vacuum for 16 h. Coupling of 4-cyanovaleric acid to the vinyl group of the skeletal structure through a covalent organic bond was established by an 18% increase in particle carbon content, and an ion-exchange capacity of 0.18 meq/g assigned to the carboxylic group.

Example 9

Vinyl hybrid silica particles (product 3p1 of Example 5) were sized and acid washed according to Example 5. A 10 g amount of the 5 μm vinyl hybrid particles was combined with 62 g of 2,2'-azobis(2-methylpropionamidine)dihydrochloride (Aldrich Chemical) in 125 mL of a methanol/water (50/50, v/v) solution. The suspension was deoxygenated by bubbling argon gas through it for 1 h, after which an argon blanket was maintained over the suspension. The suspension was heated to 50° C. for 20 h and subsequently cooled to room temperature. The mixture was transferred to a filter apparatus and washed exhaustively with toluene, acetone/water (50/50, v/v), and acetone (all solvents HPLC grade, J.T. Baker). The washed particles were then dried at 80° C. under vacuum for 16 h. Coupling of (2-methylpropionamidine)hydrochloride to the vinyl group of the skeletal structure through a covalent organic bond was established by a 10% increase in particle carbon content, and an ion-exchange capacity of 0.15 meq/g, assigned to the amidine hydrochloride group. Furthermore, $^{13}C$ CPMAS NMR spectroscopy of the particles showed resonances assigned to the 2-methylpropionamidine group.

Example 10

Vinyl hybrid silica particles (product 3p1 of Example 5) were sized and acid washed according to Example 5. A 2 g amount of the 7 μm vinyl hybrid particles was combined with 2.1 g of N-octadecylacrylamide (Aldrich Chemical) in 20 mL of toluene (J.T. Baker). The suspension was deoxygenated by bubbling argon gas through it for 1 h, after which an argon blanket was maintained over the suspension. While maintaining an argon blanket, 0.4 g of VAZO 88 was added to the reaction, and the reaction mixture was heated to 70° C. for 17 h. The flask was then cooled to room temperature, and the particles were transferred to a filter apparatus. The filtered particles were washed exhaustively with tetrahydrofuran, toluene, acetone, acetone/water (50/50, v/v), and acetone (all solvents HPLC grade, J.T. Baker). The washed particles were then dried at 80° C. under vacuum for 16 h. Radical initiated coupling of octadecylacrylamide groups with vinyl groups of the skeletal structure through a covalent organic bond was established by a 29% increase in particle carbon content, which converts to a surface concentration of 1.02 μmol/m². Furthermore, $^{13}C$ CPMAS NMR and FTIR spectroscopy of the particles showed resonances consistent with octadecylacrylamide addition to the vinyl groups.

Example 11

Vinyl hybrid silica particles (product 3p1 of Example 5) were sized and acid washed according to Example 5. A 3 g amount of the 7 μm vinyl hybrid particles was combined with 0.9 g dicyclopentadiene (Aldrich Chemical) in 25 mL of toluene (J.T. Baker). The suspension was heated to reflux (111° C.) for 16 h and then cooled to room temperature. The particles were transferred to a filter apparatus and washed exhaustively with toluene and acetone (both HPLC grade, J.T. Baker). The washed particles were then dried at 80° C. under vacuum for 16 h. Diels-Alder cycloaddition of cyclopentadiene with the vinyl groups through a covalent organic bond was established by a 14% increase in particle carbon content that is analogous to a surface concentration of 1.36 μmol/m². Furthermore, $^{13}C$ CPMAS NMR and FTIR spectroscopy of the particles showed resonances consistent with diene addition.

Example 12

Propanol hybrid silica particles (product 3q of Example 5) were sized and acid washed according to Example 5. A 3 g amount of the dried 6 μm propanol hybrid particles and 4.9 g of octylisocyanate (Aldrich Chemical) were combined with 75 mL of dry toluene (J.T. Baker) under an argon blanket. The suspension was heated to reflux (111° C.) for 4 h and then cooled to 60° C. The particles were transferred to a filter apparatus and washed exhaustively with toluene heated to 80° C. and then room temperature acetone (both HPLC grade, J.T. Baker). The washed particles were then dried at 80° C. under vacuum for 16 h. Reaction of the octyl isocyanate molecule with the hybrid particle's hydroxyl group to form a carbamate group and thereby connect the octyl chain to the particle's skeletal structure through a covalent organic bond was established by a 94% increase in particle carbon content that is analogous to a surface concentration of 1.59 μmol/m² of O-propylsilyl N-octyl carbamate group. Furthermore, $^{13}C$ CPMAS NMR spectroscopy of the particles showed resonances consistent with addition product, where 40% of the propanol groups were converted to carbamate groups, and the remaining propanol groups remained unreacted.

Example 13

A 3 g amount of the dried 6 μm propanol hybrid particles, as described in Example 12, and 6.7 g of dodecyl isocyanate (Aldrich Chemical) were combined with 75 mL of dry toluene (J.T. Baker) and reacted in the same way as described in Example 12. Addition of the dodecyl isocyanate molecule to the hybrid particle's hydroxyl group to form a carbamate group and thereby connect the dodecyl chain to the particle's skeletal structure through a covalent organic bond was established by the reaction procedure and a 119% increase in particle carbon content that is analogous to a surface loading of 1.41 μmol/m² of O-propylsilyl N-dodecyl carbamate group. Furthermore, $^{13}C$ CPMAS NMR spectroscopy of the particles showed resonances consistent with addition product, where 40% of the propanol groups were converted to carbamate groups, and the remaining propanol groups remained unreacted.

Example 14

Propanol hybrid silica particles (product 3q of Example 5) were sized and acid washed according to Example 5. A 3 g amount of the dried 6 μm propanol hybrid particles, 0.47 g of p-toluenesulfonic acid (Aldrich Chemical), and 10.0 g of lauric acid (Sigma Chemical, St. Louis, Mo.) were combined with 100 mL of dry xylene (J.T. Baker) under an argon blanket. The suspension was heated to reflux (145° C.) for 16 h and then cooled to 30° C. The particles were then transferred to a filter apparatus and washed exhaustively with toluene, acetone, acetone/water (50/50, v/v), and acetone again (all solvents HPLC grade, J.T. Baker). The washed particles were then dried at 80° C. under vacuum for 16 h. Reaction of the lauric acid molecule with the hybrid particle's hydroxyl group to form a carboxylic acid ester bond and thereby connect the n-$C_{11}H_{23}$ alkyl chain to the particle's skeletal structure through a covalent organic bond was established by the reaction procedure and a 157% increase in particle carbon content, which converts to a surface concentration of 2.06 μmol/m$^2$ of n-$C_{11}H_{23}$ alkyl groups. Furthermore, $^{13}$C CPMAS NMR spectroscopy of the particles showed resonances consistent with ester product, where 30% of the propanol groups were converted to ester groups, and the remaining propanol groups remained unreacted.

Example 15

Propanol hybrid silica particles (product 3q of Example 5) were sized and acid washed according to Example 5. A 3 g amount of the dried 6 μm propanol hybrid particles and 3.3 mL of dried triethylamine (Aldrich Chemical) were combined with 150 mL of dry dichloromethane (HPLC grade, J.T. Baker) under an argon blanket and chilled to 5° C. Maintaining a temperature of 5° C., 1.95 mL of methacryloyl chloride (Aldrich Chemical) was added dropwise to the suspension. Three additional aliquots of triethylamine and methacryloyl chloride were added for a combined total of 13.2 mL triethylamine and 7.8 mL methacryloyl chloride. The suspension was allowed to warm to room temperature and was stirred an additional 16 h. The particles were transferred to a filter apparatus and washed exhaustively with dichloromethane, acetone, water, and again with acetone (all solvents HPLC grade, J.T. Baker). The washed particles were then dried at 80° C. under vacuum for 16 h. Reaction of the methacryloyl chloride molecule with the hybrid particle's hydroxyl group to form a carboxylic acid ester bond and thereby connect the methacrylate's vinyl group to the particle's skeletal structure through a covalent organic bond was established by a 63% increase in particle carbon content that is analogous to a surface concentration of 2.30 μmol/m$^2$ of methacrylate groups. Furthermore, $^{13}$C CPMAS NMR spectroscopy of the particles showed resonances consistent with ester product, where 60% of the propanol groups were converted to ester groups, and the remaining propanol groups remained unreacted.

Example 16

A 0.5 g amount of the dried styrylethyl hybrid particles (product 3t of Example 5) was brominated in the manner described in Example 6. Greater than 99% of the vinyl groups were converted into the dibromoethane analog as determined by $^{13}$C CPMAS NMR spectroscopy.

Example 17

Styrylethyl hybrid silica particles (product 3u of Example 5) were sized according to Example 5. A 0.5 g amount of the dried 8 μm styrylethyl hybrid particles was brominated in the manner described in Example 6. Greater than 99% of the vinyl groups were converted into the dibromoethane analog as determined by $^{13}$C CPMAS NMR spectroscopy.

Example 18

A 2.0 g amount of the dried styrylethyl hybrid particles (product 3t of Example 5) was suspended in 20 mL of toluene (J.T. Baker) and refluxed for 2 h under an argon atmosphere to deoxygenate and removed adsorbed water via azeotrope. After cooling to room temperature under dry argon, 0.6 g of 1,1'-azobis(cyclohexanecarbonitrile) (Aldrich Chemical) was added. The suspension was stirred and heated to 80° C. for 17 h then heated to 100° C. for 2.5 h. After cooling, the particles were recovered by filtration, and exhaustively washed with toluene, dichloromethane and acetone. The washed particles were then dried at 80° C. under vacuum for 16 h. Reaction of the cyclohexanecarbonitrile molecule with the hybrid particle's vinyl group, thereby connecting the reagent to the particle's skeletal structure through a covalent organic bond was established by a 23% increase in particle carbon content that is analogous to a surface concentration of 1.09 μmol/m$^2$ of cyclohexanecarbonitrile groups. Greater than 99% of the vinyl groups were polymerized as determined by $^{13}$C CPMAS NMR spectroscopy.

Example 19

Styrylethyl hybrid silica particles (product 3u of Example 5) were sized according to Example 5. A 2.0 g amount of the dried 8 μm styrylethyl hybrid particles was reacted with 0.9 g of 1,1'-azobis(cyclohexanecarbonitrile) in the manner described above for Example 18. Reaction of the cyclohexanecarbonitrile molecule with the hybrid particle's vinyl group, thereby connecting the reagent to the particle's skeletal structure through a covalent organic bond was established by a 9.7% increase in particle carbon content, which converts to a surface concentration of 1.07 μmol/m$^2$ of cyclohexanecarbonitrile groups. Greater than 99% of the vinyl groups were polymerized as determined by $^{13}$C CPMAS NMR spectroscopy

Example 20

A 2.0 g amount of the dried styrylethyl hybrid particles (product 3t of Example 5) was combined with 0.29 g of 1,1'-azobis(cyclohexanecarbonitrile) (Aldrich Chemical) and 25 mL of dichloromethane (J.T. Baker) in a 25 mL round-bottom flask. After stirring the suspension until the radical initiator was dissolved, the dichloromethane was removed from the suspension by rotary-evaporation. The initiator coated particles were dried under high vacuum (0.1 mm Hg) for 18 h. In a similar sized flask, 10 mL of styrene (Aldrich Chemical) was added and degassed via high vacuum. Under a closed, reduced pressure system, styrene vapor was allowed to equilibrate between the two flasks for 1.5 h, thereby adsorbing onto the styrylethyl hybrid particles. The coated, styrylethyl hybrid particles were then vented to argon and heated to 80° C. for 20 h. After cooling, the particles were recovered by filtration and exhaustively washed with toluene, dichloromethane and acetone. The washed particles were then dried at 80° C. under vacuum for 16 h. Greater than 99% of the vinyl groups were copolymerized with the adsorbed styrene as determined by $^{13}C$ CPMAS NMR spectroscopy. Reaction of the cyclohexanecarbonitrile and styrene molecules with the hybrid particle's vinyl group thereby connecting the reagents to the particle's skeletal structure through a covalent organic bond was established by a 16.3% increase in particle carbon content.

Example 21

Styrylethyl hybrid silica particles (product 3u of Example 5) were sized according to Example 5. A 2.0 g amount of the dried 8 μm styrylethyl hybrid particles was reacted with 0.25 g of 1,1'-azobis(cyclohexanecarbonitrile) in the manner described above for Example 20. Greater than 99% of the vinyl groups were copolymerized with the adsorbed styrene as determined by $^{13}C$ CPMAS NMR spectroscopy. Reaction of the cyclohexanecarbonitrile and styrene molecules with the hybrid particle's vinyl group, thereby connecting the reagents to the particle's skeletal structure through a covalent organic bond was established by a 42% increase in particle carbon content.

Example 22

Styrylethyl hybrid silica particles (product 3u of Example 5) were sized according to Example 5. A 2.0 g amount of the dried 8 μm styrylethyl hybrid particles was reacted with 0.20 g of 1,1'-azobis(cyclohexanecarbonitrile) in the manner described above for Example 20, with the exception that divinylbenzene (Aldrich Chemical) was used as the adsorbed monomer. Greater than 99% of the vinyl groups were copolymerized with the adsorbed divinylbenzene as determined by $^{13}C$ CPMAS NMR spectroscopy. Reaction of the cyclohexanecarbonitrile and divinylbenzene molecules with the hybrid particle's vinyl group, thereby connecting the reagents to the particle's skeletal structure through a covalent organic bond was established by a 37% increase in particle carbon content.

Example 23

The surfaces of the hybrid silica particles were modified with a variety of chlorotrialkylsilanes as follows: $1\times10^{-5}$ moles of silane per square meter of particle surface area and 1.2 equivalents (per mole silane) of a base activator such as 4-(dimethylamino)pyridine (Aldrich Chemical), imidazole (Aldrich Chemical), or pyridine (J.T. Baker) were added to a mixture of 10 g of hybrid silica in 50 mL of toluene (J.T. Baker), and the resultant mixture was refluxed for 2-4 h. The modified hybrid silica particles were filtered and washed successively with water, toluene, 1:1 v/v acetone/water, and acetone (all solvents from J.T. Baker), and then dried at 80° C. under reduced pressure for 16 h. The surface concentration (μmol/m$^2$) of trialkylsilyl groups was determined by the difference in particle % C before and after the surface modification as measured by elemental analysis.

A secondary surface modification or end capping reaction was performed using a second silane, chlorotrimethylsilane (Aldrich Chemical), following the above procedure with respect to reagent amounts and reaction conditions. Table 6 lists the unmodified hybrid particle composition, the chemical formula of the first silane, the chemical formula of the second or end capping silane, the surface concentration of the first silane bonded phase, and total % C for selected final modified particles. Silanes and their sources were as follows: chlorodimethyloctadecylsilane and chlorotrimethylsilane (both from Aldrich Chemical); 3-(chlorodimethylsilyl) propyl N-octadecylcarbamate, 3-(chlorodimethylsilyl) propyl N-dodecylcarbamate, and 3-(chlorodimethylsilyl) propyl N-benzylcarbamate (all prepared as described in Neue, Niederlander, and Petersen in U.S. Pat. No. 5,374,755); [3-(pentafluorophenyl)-propyl]dimethylchlorosilane, octyldiisopropylchlorosilane, and triacontyldimethylchlorosilane (all from Gelest, Inc.).

TABLE 6

| Product | Composition of Hybrid Material Prior to Modification | Primary Silane Chemical Formula | Secondary Silane Chemical Formula | Surface Concentration (μmol/m$^2$) | % C Final Modified Particle |
|---|---|---|---|---|---|
| 24a | $SiO_2/(CH_3SiO_{1.5})_{0.2}$ | $CH_3(CH_2)_{17}Si(CH_3)_2Cl$ | $ClSi(CH_3)_3$ | 2.73 | 11.06 |
| 24b | $SiO2/(CH_3SiO_{1.5})_{0.35}$ | $CH_3(CH_2)_{17}Si(CH_3)_2Cl$ | $ClSi(CH_3)_3$ | 2.50 | 14.80 |
| 24c | $SiO_2/(CH_3SiO_{1.5})_{0.5}$ | $CH_3(CH_2)_{17}Si(CH_3)_2Cl$ | $ClSi(CH_3)_3$ | 2.18 | 15.02 |
| 24d | $SiO_2/(CH_3SiO_{1.5})_{0.5}$ | $CH_3(CH_2)_{17}Si(CH_3)_2Cl$ | $ClSi(CH_3)_3$ | 2.23 | 17.21 |
| 24e | $SiO_2/(CH_3SiO_{1.5})_{0.5}$ | $CH_3(CH_2)_{17}NHC(O)O(CH_2)_3Si(CH_3)_2Cl$ | $ClSi(CH_3)_3$ | 1.80 | 14.84 |
| 24f | $SiO_2/(CH_3SiO_{1.5})_{0.5}$ | $CH_3(CH_2)_{11}NHC(O)O(CH_2)_3Si(CH_3)_2Cl$ | $ClSi(CH_3)_3$ | 2.34 | 14.74 |
| 24g | $SiO_2/(CH_3SiO_{1.5})_{0.5}$ | $CH_3(CH_2)_7NHC(O)O(CH_2)_3Si(CH_3)_2Cl$ | $ClSi(CH_3)_3$ | 2.42 | 13.46 |
| 24h | $SiO_2/(CH_3SiO_{1.5})_{0.5}$ | $C_6H_5(CH_2)NHC(O)O(CH_2)_3Si(CH_3)_2Cl$ | $ClSi(CH_3)_3$ | 2.49 | 13.02 |
| 24i | $SiO_2/(CH_3SiO_{1.5})_{0.5}$ | $C_6F_5(CH_2)_3Si(CH_3)_2Cl$ | $ClSi(CH_3)_3$ | 2.27 | 11.66 |
| 24j | $SiO_2/(CH_3SiO_{1.5})_{0.5}$ | $CH_3(CH_2)_7Si[CH(CH_3)_2]_2Cl$ | $ClSi(CH_3)_3$ | 1.23 | 10.76 |
| 24k | $SiO_2/(CH_3SiO_{1.5})_{0.5}$ | $CH_3(CH_2)_{29}Si(CH_3)_2Cl$ | $ClSi(CH_3)_3$ | 1.94 | 18.48 |
| 24l | $SiO_2/[C_2H_4(SiO_{1.5})_2]_{0.25}$ | $CH_3(CH_2)_{11}NHC(O)O(CH2)_3Si(CH_3)_2Cl$ | $ClSi(CH_3)_3$ | 2.55 | 15.28 |
| 24m | $SiO_2/[HOC_3H_6SiO_{1.5}]_{0.10}$ | $CH_3(CH_2)_7Si[CH(CH_3)_2]_2Cl$ | — | 1.74 | 13.89 |
| 24n | $SiO_2/[RSiO_{1.5}]_{0.10}$ where R = 60% $HOC_3H_6$ and 40% $CH_3(CH_2)_7NHC(O)OC_3H_6$ | $ClSi(CH_3)_3$ | — | 2.44 | 12.95 |
| 24o | $SiO_2/[RSiO_{1.5}]_{0.10}$ where R = 60% $HOC_3H_6$ and 40% $CH_3(CH_2)_{11}NHC(O)OC_3H_6$ | $ClSi(CH_3)_3$ | — | 3.10 | 14.50 |

Example 24

The surfaces of the hybrid silica particles were modified with a variety of dialkyldichlorosilanes, alkyltrichlorosilanes, and alklytrialkoxysilanes as follows: $1\times10^{-5}$ moles of silane per square meter of particle surface area and 1.2 equivalents (per mole silane) of a base activator such as 4-(dimethylamino)pyridine (Aldrich Chemical), imidazole (Aldrich Chemical), or pyridine (J.T. Baker) were added to a mixture of 10 g of hybrid silica in 50 mL of toluene (J.T. Baker) and the resultant mixture was refluxed for 2-4 h. The modified hybrid silica particles were filtered and washed successively with toluene, 1:1 v/v acetone/water, and acetone (all solvents from J.T. Baker). The washed particles were then heated in a 4.5:1 v/v solution of acetone/0.12 M ammonium acetate for 2.0-3.0 hours at 60° C. The particles were subsequently cooled, filtered, and washed successively with 1:1 v/v acetone/water, and acetone, and then dried at 80° C. under reduced pressure for 16 h. The surface concentration ($\mu mol/m^2$) of dialkylsilyl and alkylsilyl groups was determined by the difference in particle % C before and after the surface modification as measured by elemental analysis.

A secondary surface modification or end capping reaction was run using a second silane, including chlorotrimethylsilane, chlorotriethylsilane, and tert-butyldimethylchlorosilane (all from Aldrich Chemical), following the above procedure with respect to reagent amounts and reaction conditions. Table 7 lists the unmodified hybrid particle composition, the chemical formula of the first silane, the chemical formula of the second or end capping silane, the surface concentration of the first silane bonded phase, and total % C for selected final modified particles. Silanes and their sources were as follows: octadecyltrichlorosilane (Aldrich Chemical); octadecylmethyldichlorosilane, (3-phenylpropyl)trichlorosilane, (3-phenylpropyl)methyldichlorosilane, (4-phenylbutyl)methyldichlorosilane, phenethyltrichlorosilane, [3-(pentafluorophenyl)propyl]trichlorosilane, triacontyltrichlorosilane (all from Silar Laboratories, Scotia, N.Y.); (2-phenylpropyl)methyldichlorosilane (Gelest Inc.); 1H,1H,2H,2H-perfluorooctyltriethoxysilane (Sivento, Piscataway, N.J.); phenyltrichlorosilane, 3-cyanopropyltrichlorosilane (Hüls, Piscataway, N.J.).

TABLE 7

| Product | Composition of Hybrid Material Prior to Modification | Primary Silane Chemical Formula | Secondary Silane Chemical Formula | Surface Concentration ($\mu mol/m^2$) | % C Final Modified Particle |
|---|---|---|---|---|---|
| 25a | $SiO_2/(CH_3SiO_{1.5})_{0.5}$ | $CH_3(CH_2)_{17}Si(CH_3)Cl_2$ | $ClSi(CH_3)_3$ | 2.23 | 15.31 |
| 25b | $SiO_2/(CH_3SiO_{1.5})_{0.5}$ | $C_6H_5(CH_2)_3Si(CH_3)Cl_2$ | $ClSi(CH_3)_3$ | 2.31 | 12.25 |
| 25c | $SiO_2/(CH_3SiO_{1.5})_{0.5}$ | $C_6H_5(CH_2)_3Si(CH_3)Cl_2$ | $ClSi(CH_2CH_3)_3$ | 2.31 | 12.39 |
| 25d | $SiO_2/(CH_3SiO_{1.5})_{0.5}$ | $C_6H_5(CH_2)_3Si(CH_3)Cl_2$ | $Cl(CH_3)_2SiC(CH_3)_3$ | 2.31 | 12.07 |
| 25e | $SiO_2/(CH_3SiO_{1.5})_{0.5}$ | $C_6H_5(CH_3)CHCH_2Si(CH_3)Cl_2$ | $ClSi(CH_3)_3$ | 2.11 | 11.76 |
| 25f | $SiO_2/(CH_3SiO_{1.5})_{0.5}$ | $C_6H_5(CH_2)_4Si(CH_3)Cl_2$ | $ClSi(CH_3)_3$ | 2.37 | 12.76 |
| 25g | $SiO_2/(CH_3SiO_{1.5})_{0.5}$ | $CH_3(CH_2)_{29}SiCl_3$ | $ClSi(CH_3)_3$ | 2.30 | 19.84 |
| 25h | $SiO_2/(CH_3SiO_{1.5})_{0.5}$ | $CH_3(CH_2)_{17}SiCl_3$ | $ClSi(CH_3)_3$ | 2.13 | 15.43 |
| 25i | $SiO_2/(CH_3SiO_{1.5})_{0.5}$ | $CH_3(CH_2)_{17}SiCl_3$ | $ClSi(CH_2CH_3)_3$ | 2.13 | 15.75 |
| 25j | $SiO_2/(CH_3SiO_{1.5})_{0.5}$ | $CH_3(CH_2)_{17}SiCl_3$ | $Cl(CH_3)_2SiC(CH_3)_3$ | 2.13 | 15.33 |
| 25k | $SiO_2/(CH_3SiO_{1.5})_{0.5}$ | $CH_3(CH_2)_7SiCl_3$ | $ClSi(CH_3)_3$ | 2.23 | 11.70 |
| 25l | $SiO_2/(CH_3SiO_{1.5})_{0.5}$ | $CF_3(CF_2)_5(CH_2)_2Si(OCH_2CH_3)_3$ | $ClSi(CH_3)_3$ | 1.46 | 9.90 |
| 25m | $SiO_2/(CH_3SiO_{1.5})_{0.5}$ | $C_6F_5(CH_2)_3SiCl_3$ | $ClSi(CH_3)_3$ | 2.13 | 11.67 |
| 25n | $SiO_2/(CH_3SiO_{1.5})_{0.5}$ | $C_6H_5(CH_2)_2SiCl_3$ | $ClSi(CH_3)_3$ | 2.42 | 12.02 |
| 25o | $SiO_2/(CH_3SiO_{1.5})_{0.5}$ | $C_6H_5(CH_2)_2SiCl_3$ | $ClSi(CH_2CH_3)_3$ | 2.35 | 12.09 |
| 25p | $SiO_2/(CH_3SiO_{1.5})_{0.5}$ | $C_6H_5(CH_2)_2SiCl_3$ | $Cl(CH_3)_2SiC(CH_3)_3$ | 2.42 | 11.72 |
| 25q | $SiO_2/(CH_3SiO_{1.5})_{0.5}$ | $C_6H_5(CH_2)_4SiCl_3$ | $ClSi(CH_3)_3$ | 2.20 | 12.57 |
| 25r | $SiO_2/(CH_3SiO_{1.5})_{0.5}$ | $C_6H_5SiCl_3$ | $ClSi(CH_3)_3$ | 2.09 | 10.74 |
| 25s | $SiO_2/(CH_3SiO_{1.5})_{0.5}$ | $C_6H_5SiCl_3$ | $Cl(CH_3)_2SiC(CH_3)_3$ | 2.09 | 10.88 |
| 25t | $SiO_2/(CH_3SiO_{1.5})_{0.5}$ | $NC(CH_2)_3SiCl_3$ | — | 2.31 | — |
| 25u | $SiO_2/[C_2H_4(SiO_{1.5})_2]_{0.25}$ | $CH_3(CH_2)_{17}SiCl_3$ | $ClSi(CH_3)_3$ | 2.62 | 15.74 |
| 25v | $SiO_2/(H_2C=CHSiO_{1.5})_{0.5}$ | $CH_3(CH_2)_{17}SiCl_3$ | $ClSi(CH_3)_3$ | 1.28 | 18.26 |
| 25w | $SiO_2/(RsiO_{1.5})_{0.5}$ where R = 20% $BrCH_2CHBr$ and 80% $H_2C=CH$ | $CH_3(CH_2)_{17}SiCl_3$ | $ClSi(CH_3)_3$ | 1.73 | 14.31 |
| 25x | $SiO_2/(RSiO_{1.5})_{0.5}$ where R = 95% $CH_3CH_2$ and 5% $H_2C=CH$ | $CH_3(CH_2)_{17}SiCl_3$ | $ClSi(CH_3)_3$ | 1.38 | 17.14 |
| 25y | $SiO_2/(RSiO_{1.5})_{0.5}$ where R = 3.4% $HO_2CCH_2CH_2C(CH_3)(CN)—CH_2CH_2$ and 96.6% $H_2C=CH$ | $CH_3(CH_2)_{17}SiCl_3$ | $ClSi(CH_3)_3$ | 0.86 | 18.29 |
| 25z | $SiO_2/(RSiO_{1.5})_{0.5}$ where R = 3.4% $HClH_2N(HN=)C(CH_3)_2—CH_2CH_2$ and 96.6% $H_2C=CH$ | $CH_3(CH_2)_{17}SiCl_3$ | $ClSi(CH_3)_3$ | 1.23 | 18.85 |
| 25aa | $SiO_2/[HOC_3H_6SiO_{1.5}]_{0.10}$ | $CH_3(CH_2)_{29}SiCl_3$ | $ClSi(CH_3)_3$ | 2.16 | 19.03 |
| 25bb | $SiO_2/[HOC_3H_6SiO_{1.5}]_{0.10}$ | $CH_3(CH_2)_{17}SiCl_3$ | $ClSi(CH_3)_3$ | 2.30 | 25.47 |
| 25cc | $SiO_2/[HOC_3H_6SiO_{1.5}]_{0.10}$ | $C_6F_5(CH_2)_3SiCl_3$ | $ClSi(CH_3)_3$ | 1.92 | 13.01 |

Example 25

Selected examples of surface derivatized hybrid silicas from Example 23 were used for the separation of a mixture of neutral, polar and basic compounds listed in Table 8. The 3.9×150 mm chromatographic columns were packed using a slurry packing technique. The HPLC system consisted of an Alliance 2690 XE separations module, a model 996 photodiode array detector, a Millennium[32] v. 2.15.01 data management system (all from Waters Corporation, Milford, Mass.), and a NESLAB RTE-111 circulating water bath for column temperature control (NESLAB Instruments, Inc., Portsmouth, N.H.). Mobile phase conditions were: 20 mM KH$_2$PO$_4$/K$_2$HPO$_4$, pH 7.0/methanol (35:65 v/v); flow rate: 1.0 mL/min; temperature: 23.4° C.; detection: 254 nm.

TABLE 8

|  | Product 19b in Table 6 | Product 19c in Table 6 | Product 19d in Table 6 |
|---|---|---|---|
| k of Acenaphthene | 10.02 | 11.35 | 13.40 |
| Relative Retention (r) |  |  |  |
| Propranolol/Acenaphthene | 0.157 | 0.149 | 0.139 |
| Butyl paraben/Acenaphthene | 0.226 | 0.216 | 0.223 |
| Dipropyl Phthalate/Acenaphthene | 0.411 | 0.405 | 0.403 |
| Naphthalene/Acenaphthene | 0.437 | 0.436 | 0.437 |
| Amitriptyline/Acenaphthene | 1.483 | 1.525 | 1.395 |

It can be seen that the packing materials based on the hybrid materials provide ample retention and resolution in the separation of neutral, polar, and basic compounds. (Relative retention is the (k of the analyte) divided by the (k of acenaphthene). Therefore values less than one, indicate less retention than acenaphthene, and values greater than one, indicate more retention than acenaphthene. Relative retention is a well known parameter in the field of HPLC.)

Example 26

Selected examples of surface derivatized hybrid materials from Examples 23 and 24 as well as similarly derivatized commercial columns based on silica which have similar alkyl silyl groups were evaluated for basic compound USP peak tailing factors using the mobile phase and test conditions of Example 25. The results are shown in Table 9.

TABLE 9

|  | USP Tailing Factors | |
|---|---|---|
| Column | Propranolol | Amitriptyline |
| Commercial Column A (C$_{30}$ Type) | 1.6 | 3.6 |
| Example 23j (C$_{30}$ Type) | 1.3 | 2.3 |
| Commercial Column C (C$_{18}$ Type) | 4.2 | 7.0 |
| Commercial Column D (C$_{18}$ Type) | 1.3 | 1.8 |
| Commercial Column E (C$_{18}$ Type) | 1.0 | 1.7 |
| Commercial Column F (C$_{18}$ Type) | 1.3 | 1.5 |
| Example 23b (C$_{18}$ Type) | 1.1 | 1.0 |
| Example 23c (C$_{18}$ Type) | 1.0 | 1.4 |
| Example 23d (C$_{18}$ Type) | 1.0 | 1.4 |
| Example 24a (C$_{18}$ Type) | 1.0 | 1.3 |
| Example 24h (C$_{18}$ Type) | 1.1 | 1.3 |
| Example 24i (C$_{18}$ Type) | 1.2 | 1.7 |
| Example 24u (C$_{18}$ Type) | 1.1 | 2.0 |
| Commercial Column I (Embedded Polar Type) | 1.3 | 1.3 |
| Example 23f (Embedded Polar Type) | 1.1 | 1.2 |
| Example 23l (Embedded Polar Type) | 1.0 | 1.1 |
| Commercial Column J (C$_8$ Type) | 1.1 | 1.3 |
| Commercial Column K (C$_8$ Type) | 1.2 | 1.4 |
| Example 23k (C$_8$ Type) | 1.1 | 1.3 |
| Commercial Column L (Ph Type) | 1.8 | 3.9 |
| Commercial Column M (Ph Type) | 2.1 | 1.6 |
| Example 23h (Ph Type) | 1.3 | 1.2 |
| Example 24c (Ph Type) | 1.2 | 1.4 |
| Example 24e (Ph Type) | 1.1 | 1.5 |
| Example 24f (Ph Type) | 1.0 | 1.3 |
| Commercial Column O (C$_6$F$_5$ Type) | 3.8 | 6.9 |
| Commercial Column P (C$_6$F$_5$ Type) | 1.3 | 4.2 |
| Example 23i (C$_6$F$_5$ Type) | 1.2 | 1.4 |
| Example 24m (C$_6$f$_5$ Type) | 2.3 | 1.8 |
| Commercial Column Q (CN type) | 1.7 | 3.0 |
| Example 24t (CN Type) | 1.2 | 1.4 |

It can be seen that the basic compound tailing factors on the packing materials based on the hybrid materials were generally lower than on the commercial silica-based materials (a lower value corresponds to reduced tailing).

Example 27

Selected examples of surface derivatized hybrid silicas from Examples 23 and 24 as well as similarly derivatized commercial columns based on silica gel which have similar alkyl silyl groups were evaluated for stability in alkaline mobile phases using the following procedure. Columns were prepared by slurry packing the materials into 4.6×150 mm steel columns, and the analysis conditions were as follows: 1) The plate number, N, (5 sigma method) was measured for a test analyte, acenaphthene. Mobile phase conditions were acetonitrile-20 mM KH$_2$PO$_4$/K$_2$HPO$_4$ pH 7.00 (40:60, v/v) at a flow of 1.0 mL/min and a column temperature of 50.0° C. 2) The column was purged with 50 mM triethylamine pH 10.00 mobile phase and run for 15 min in the 50 mM triethylamine pH 10.00 mobile phase at a flow of 2.0 mL/min and a column temperature of 50.0° C. 3) In 15 min increments, the column was purged with 100% water (10 minutes at 2.0 mL/minute) and then purged with 100% methanol (10 minutes at 2.0 mL/minute). 4) The column was then purged and equilibrated with the mobile phase of step 1 above, and N for acenaphthene was measured. 5) The process was then repeated starting at step 2. Packed columns were kept in a 50° C. water bath throughout the test. Column lifetime is defined as the time of exposure to the pH 10 triethylamine solution when the efficiency of the column drops to 50% of its initial value. The results are shown in Table 10.

TABLE 10

| Column | Lifetime (h) |
|---|---|
| Commercial Column A (C$_{30}$ Type) | 17 |
| Example 23j (C$_{30}$ Type) | 57 |
| Commercial Column C (C$_{18}$ Type) | 18 |
| Commercial Column D (C$_{18}$ Type) | 17 |
| Commercial Column E (C$_{18}$ Type) | 28 |
| Commercial Column F (C$_{18}$ Type) | 23 |
| Commercial Column G (C$_{18}$ Type) | 23 |
| Example 23a (C$_{18}$ Type) | 51 |
| Example 23c (C$_{18}$ Type) | 48 |
| Example 23d (C$_{18}$ Type) | 50 |
| Example 24a (C$_{18}$ Type) | 36 |
| Example 24h (C$_{18}$ Type) | 41 |
| Example 24i (C$_{18}$ Type) | 34 |
| Example 24u (C$_{18}$ Type) | >153 |

TABLE 10-continued

| Column | Lifetime (h) |
| --- | --- |
| Example 24x ($C_{18}$ Type) | 41 |
| Commercial Column I (Embedded Polar Type) | 29 |
| Example 23f (Embedded Polar Type) | 32 |
| Example 23l (Embedded Polar Type) | 303 |
| Commercial Column J ($C_8$ Type) | 18 |
| Commercial Column K ($C_8$ Type) | 13 |
| Example 23k ($C_8$ Type) | 26 |
| Commercial Column L (Ph Type) | 20 |
| Commercial Column M (Ph Type) | 16 |
| Example 23h (Ph Type) | 29 |
| Example 24c (Ph Type) | 25 |
| Example 24e (Ph Type) | 26 |
| Example 24f (Ph Type) | 29 |
| Commercial Column O ($C_6F_5$ Type) | 14 |
| Commercial Column P ($C_6F_5$ Type) | 6 |
| Example 23i ($C_6F_5$ Type) | 24 |
| Example 24m ($C_6F_5$ Type) | 18 |
| Commercial Column Q (CN type) | 5 |
| Example 24t (CN Type) | 9 |

It is evident that the lifetimes of the columns containing hybrid packing materials are greatly improved over the commercial columns containing silica-based materials.

Example 28

A 4.6×50 mm chromatography column was packed with a mixture of 2.5 µm XTerra® MS C18 (Waters Corporation), or the product of Example 24h and unbonded 1.8 µm spherical silica particles using a downward slurry technique. The column packing apparatus comprised a high-pressure liquid packing pump (Model No: 10-500FS100 or equivalent, SC Hydraulic Engineering Corp., Los Angeles, Calif.) and a slurry packing reservoir (55 mL). The assembled column was connected to a packing reservoir, and a slurry of the mixed stationary phase (6:1 volume ratio of XTerra MS C18 to unbonded silica particles) was suspended in a toluene:methyl ethyl ketone 85:15 (v/v) mixture, sonicated for 5 min, and then poured into the packing reservoir. The reservoir was closed and methanol was then pumped through the column, ultimately reaching a pressure of 6000 PSI. After allowing sufficient time for bed consolidation, the pump was turned off and the pressure was released.

The column was rinsed with 0.1 M NaOH, and then with acetone. The column was purged with $N_2$ gas for 1 hour, providing rapid drying. Physically adsorbed water was removed by heating the column at 120° C. for 4 hours in a vacuum oven (F6000 or equivalent, Barnstead/Thermolyne Corporation, Dubuque, Iowa). The column was then purged with $N_2$ gas for 60 min and sealed. The sealed column was sintered in a furnace (VWR 1410 or equivalent, VWR Scientific Products, Boston, Mass.) for 12 hours at 300° C.

The resulting column containing the reversed-phase hybrid particles was rinsed with acetone and then dried by purging with $N_2$ for 24 hours. This drying step was added to minimize the wetting of the reversed-phase surface. The column was washed with 10 mL 0.1 N NaOH aqueous solution, and then with 40 mL 0.01 N NaOH aqueous solution at 50° C. Subsequently, the column was washed with water while gradually decreasing the temperature to 20° C. The column was ultimately rinsed with acetonitrile at room temperature to produce a column containing a hybrid inorganic/organic monolith material comprised of coalesced hybrid inorganic/organic particles.

FIG. 1 indicates the pressure change before and after the sintering and washing steps described above as a function of the amount of unbonded silica used in the original mixture.

Example 29

Pluronic P-105, 0.7 g, (from BASF Corp., Mount Olive, N.J.) was dissolved in 5 mL of an acetic acid solution selected from the following concentrations, respectively: 30 mM, 50 mM, 70 mM, and 110 mM. The resulting solution was agitated at room temperature until all of the Pluronic P-105 was dissolved and was then chilled in an ice-water bath.

Meanwhile, methyltrimethoxysilane, 5 mL, and tetramethoxysilane, 10 mL, (both from Gelest Inc., Tullytown, Pa.) were mixed at room temperature in a separate, sealed flask. An aliquot of 2 mL of the mixed silane solution was slowly added into the chilled acetic acid mixture, whereupon the silanes dissolved into the acetic acid solution after a few minutes. The resulting transparent solution was transferred into a sealed polypropylene container (9.6 mm×10 cm) and kept at 45° C. undisturbed for 2 days. The solid white rod produced was subsequently immersed into 100 mL 0.1 N aqueous ammonium hydroxide solution for 3 days at 60° C. The monolith material was then washed with water for 2 days, solvent-exchanged to methanol for 1 day, and then dried in air for 5 hours. The monolith material was then dried under vacuum at 135° C. for 3 days, resulting in a white rod without any cracks.

The morphologies of the formed rods were observed by a scanning electron microscope. It was observed that a three-dimensional interconnected network was formed within the rods and that the skeleton thickness increased as the acetic acid concentration increased. As listed in Table 11, the monolith material obtained from 30 mM acetic acid solution had a skeleton thickness less than 0.5 µm, while the monolith material obtained from 110 mM acetic acid solution had a skeleton thickness around 5 µm.

Median pore diameter (MPD) and pore volume (PV) of thus formed rods were measured by Mercury Porosimetry. The specific surface areas (SSA), specific pore volumes (SPV) and the average pore size diameters (APD) of the mesopores were measured using the multi-point $N_2$ sorption method. Results are compiled in Table 11. The specific surface area was calculated using the BET method, the specific pore volume was the single point value determined for $P/P_0>0.98$, and the average pore diameter was calculated from the desorption leg of the isotherm using the BJH method.

TABLE 11

| Product | Acetic Acid Concentration (mM) | Skeleton Thickness (µm) | MPD (µm) | PV(1) (cc/g) | MPD (Å) | PV(2) (cc/g) | SSA (m²/g) | SPV (cc/g) | APD (Å) |
| --- | --- | --- | --- | --- | --- | --- | --- | --- | --- |
| 29a | 30 | <0.5 | 0.3 | 4.5 | — | — | 850 | 1.98 | 92 |
| 29b | 50 | 0.7 | 0.35 | 4.0 | — | — | 841 | 1.96 | 92 |
| 29c | 70 | 2 | 2.2 | 3.12 | 265 | 1.62 | 682 | 1.81 | 102 |
| 29d | 110 | 5 | 16.3 | 2.61 | 139 | 0.96 | 939 | 1.33 | 57 |

Example 30

Triton X-100, 0.7 g, (Aldrich Chemical, Milwaukee, Wis.) was dissolved in 5 mL of an acetic acid solution selected from the following concentrations, respectively: 40 mM and 80 mM. The resulting solution was agitated at room temperature until all of the Triton X-100 was dissolved and was then chilled in an ice-water bath.

Meanwhile, methyltrimethoxysilane, 5 mL, and tetramethoxysilane, 10 mL, (both from Gelest Inc., Tullytown, Pa.) were mixed at room temperature in a separate, sealed flask. An aliquot of 2 mL of the mixed silane solution was slowly added into the chilled acetic acid mixture, whereupon the silanes dissolved into the acetic acid solution after a few minutes. The resulting transparent solution was transferred into a sealed polypropylene container (9.6 mm×10 cm) and kept at 45° C. undisturbed for 2 days. The solid white rod produced was subsequently immersed into 100 mL 0.1 N aqueous ammonium hydroxide solution for 3 days at 60° C. The monolith material was then washed with water for 2 days, solvent-exchanged to methanol for 1 day, and then dried in air for 5 hours. The monolith material was then dried under vacuum at 135° C. for 3 days, resulting in a white monolith material without any cracks.

The morphologies of the formed rods were observed by a scanning electron microscope. It was observed that a three-dimensional interconnected network was formed within the rods and that the skeleton thickness increased as the acetic acid concentration increased. For example, the monolith material obtained from 40 mM acetic acid solution had a skeleton thickness less than 0.5 µm, while the monolith material obtained from 80 mM acetic acid solution had a skeleton thickness around 4 µm.

Pore size characterization of the monolith material prepared from 80 mM acetic acid is listed in Table 12.

TABLE 12

| Product | Acetic Acid Concentration (mM) | Skeleton Thickness (µm) | MPD (µm) | PV(1) (cc/g) | MPD (Å) | PV(2) (cc/g) | SSA (m²/g) | SPV (cc/g) | APD (Å) |
|---|---|---|---|---|---|---|---|---|---|
| 30 | 80 | 4 | 4.5 | 2.8 | 161 | 1.23 | 673 | 1.3 | 79 |

Example 31

The following experiment was carried out in order to demonstrate the relationship between skeleton thickness and incubation time. Rods were prepared from the same sol composition and processed under similar conditions except with different incubation times.

Pluronic P-105, 0.7 g, was dissolved in a 90 mM acetic acid solution. The resulting solution was agitated at room temperature until the Pluronic P-105 was completely dissolved and then chilled in an ice-water bath.

Meanwhile, methyltrimethoxysilane, 5 mL, and tetramethoxysilane, 10 mL, (both from Gelest Inc., Tullytown, Pa.) were mixed at room temperature in a separate, sealed flask. An aliquot of 2 mL of the mixed silane solution was slowly added into the chilled acetic acid mixture, whereupon the silanes dissolved into the acetic acid solution after a few minutes. The resulting transparent solution was transferred into a sealed polypropylene container (9.6 mm×10 cm) and kept at 45° C. undisturbed for 45 hours. The process was repeated in the same manner except the resulting transparent solution was kept undisturbed for 112 hours.

The solid white rods produced were subsequently immersed into 100 mL 0.1 N aqueous ammonium hydroxide solution for 3 days at 60° C. The monolith materials were then washed with water for 2 days, solvent-exchanged to methanol for 1 day, and then dried in air for 5 hours. The monolith materials were then dried under vacuum at 135° C. for 3 days, resulting in a white monolith material without any cracks.

The morphologies of the formed rods were observed by a scanning electron microscope. Both rods were determined to have a three dimensional interconnected skeleton network, and a skeleton thickness that increased as the incubation time increased. The material with a 112 h incubating time had a skeleton thickness around 5 µm, while the one with a 45 h incubating time had a skeleton thickness of 3.5 µm.

Example 32

The hybrid inorganic/organic monolith material rods prepared in Example 29 and 30 were immersed in 100 mL of 0.1 N tris(hydroxymethy)aminomethane (TRIS, Aldrich Chemical, Milwaukee, Wis.) in water. The pH of the solution was adjusted to 8.0 by adding concentrated acetic acid. The resulting solution was then enclosed in a stainless steel autoclave and heated to 155° C. for 24 hours. After the autoclave cooled to room temperature, the monolith material was rinsed with water for 2 days, with methanol for 1 day, and then dried in air for 4 hours. The monolith material was then dried under vacuum at 100° C. for 1 day.

Figure 2:
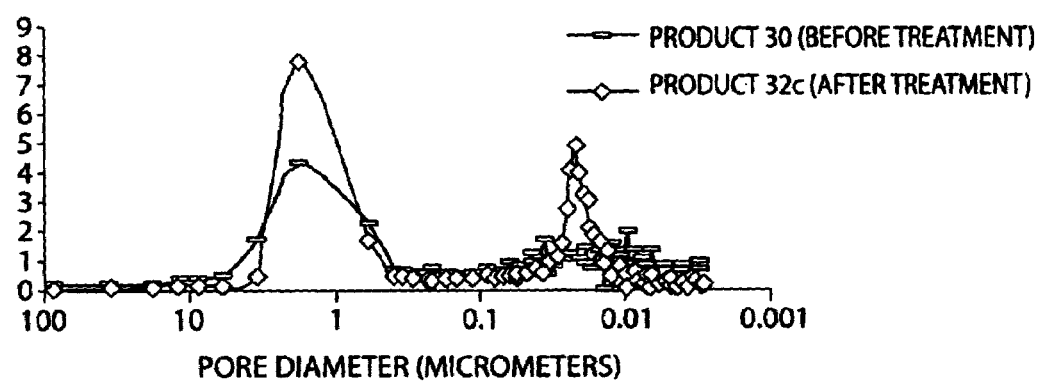
FIG. 2 depicts the pore size over pore volume relationship, or the mesopore size distribution, before and after subjection to the hydrothermal autoclave process described in Example 32.

Pore size characteristics of the resulting rods were determined using mercury porosimetry and multi-point $N_2$ sorption BET method, and the results are compiled in Table 13. An example of the pore size over pore volume relationship, or the mesopore size distribution, before and after subjection to the hydrothermal autoclave process is graphed in FIG. 2, which demonstrate that the hydrothermal process narrowed the mesopore size distribution.

TABLE 13

| Product # | Product # Before Hydrothermal Treatment | Acetic Acid Concentration (mM) | Template | SSA ($m^2/g$) | SPV (cc/g) | APD (Å) |
|---|---|---|---|---|---|---|
| 32a | 29c | 70 | Pluronic P-105 | 284 | 1.51 | 256 |
| 32b | 29d | 110 | | 176 | 1.19 | 264 |
| 32c | 30 | 80 | Triton X-100 | 173 | 1.46 | 322 |

Example 33

Three rods were prepared in a similar fashion to product 29c and were separately immersed in 100 mL 0.1 N tris (hydroxymethy)aminomethane (TRIS, Aldrich Chemical, Milwaukee, Wis.) water solutions. The hydrothermal process conditions, such as pH and temperature, of the three reactions are listed in Table 14.

Pore size characteristics of the final materials using the BET method are compiled in Table 14. As depicted, average pore size decreases both as the pH decreases and as the temperature decreases for the hydrothermal process.

TABLE 14

| Product # | pH of 0.1 N TRIS Solution | Temperature of Hydrothermal Process | SSA ($m^2/g$) | SPV (cc/g) | APD (Å) |
|---|---|---|---|---|---|
| 33a | 8.0 | 155° C. | 284 | 1.51 | 256 |
| 33b | 8.0 | 130° C. | 324 | 1.58 | 238 |
| 33c | 7.5 | 130° C. | 379 | 1.72 | 209 |

Example 34

A 1.03 g amount of the dried monolith material (product 33a of Example 33) was soaked in 20 mL of toluene (J.T. Baker) and refluxed for 3.5 h under an argon atmosphere to deoxygenate and removed adsorbed water via azeotropic distillation. After cooling to room temperature under dry argon, 0.42 g of imidazole (Aldrich Chemical) and 0.784 g of n-octadecyltriethoxysilane (Gelest Inc., Tullytown, Pa.) were added. The solution was stirred and heated to 105° C. for 20 h. The monolith material, after cooling, was exhaustively washed with toluene and acetone (J.T. Baker). The washed monolith material was dried at 80° C. under vacuum for 24 h. The surface concentration (μmol/$m^2$) of n-octadecylsilane was determined by the difference in the monolith material carbon content before and after the surface modification as measured by elemental analysis. The resulting monolith material had a 4% increase in carbon content that is analogous to a surface coverage of 0.7 (μmol/$m^2$) of n-octadecylsilane group.

Example 35

A solution was prepared consisting of 5 mL of Sylgard 184® Part A and 0.5 mL Sylgard 184® Part B (both from Dow Corning Corp., Midland, Mich.) in 100 mL ethyl acetate (HPLC grade, J.T. Baker). Octadecyl ($C_{18}$) functionalized and end capped hybrid particles of product type 25u in Example 25 were then suspended in the Sylgard®/ethyl acetate solution in a ratio of 100 mg particles per 1 milliliter of solution. The mixture was agitated manually to wet the particles, and the suspension was sonicated for 2 minutes (Branson 5510 ultrasonic bath or equivalent, Branson Ultrasonic Corp., Danbury, Conn.). The particles were then isolated by vacuum filtration (0.5 μm Tyvek® filter paper or equivalent, DuPont, Wilmington, Del.), which was monitored and stopped when the gross liquid was removed from the filter cake. The filter cakes were allowed to "air dry" at room temperature for 2 days and were then vacuum dried at 70° C. and <15 mm Hg.

The Sylgard 184® pre-coated particles, 4.80 g, were combined with 1.20 g of 5 μm spherical Symmetry silica particles (Waters Corporation) in a 50 mL polypropylene bottle. The mixture was blended manually for 5 minutes, and the mixed particles were then slurry packed into 2.1×50 mm HPLC columns using a downward slurry technique. The column packing apparatus comprised a high-pressure liquid packing pump (Model No: 10-500FS100 or equivalent, SC Hydraulic Engineering Corp., Los Angeles, Calif.) and a slurry packing reservoir (15 mL), which was connected to the assembled column. A slurry of the mixed stationary phase was prepared in tetrahydrofuran-isopropanol 70:30 (v/v) mixture, sonicated for 5 min and poured into the packing reservoir. The reservoir was then closed and methanol was pumped through the column to a pressure of 9000-9500 PSI. After sufficient time for bed consolidation the pump was turned off, and the pressure was released.

The packed columns were purged with methanol and then ethyl acetate at 0.4 mL/min flow rate using a high pressure chromatography pump (Waters 590 HPLC pump or equivalent), whereupon greater than 10 mL of each purge solvent was collected. A Sylgard 184® solution was prepared by dissolving 15 mL Sylgard 184® Part A and 1.5 mL Sylgard 184® Part B in 100 mL ethyl acetate. The solutions were used either within 2 hours of preparation or after allowing pre-polymerization (aging) for 3, 25 and 72 hours, respectively. The Sylgard 184® solutions were pumped through packed columns (see above) separately at 0.2 mL/min flow rate using a Waters 590 HPLC pump until 3 mL of effluent was collected. The column pressure was allowed to drop for 30 minutes prior to disconnection. The columns were left uncapped in a chemical fume hood's air stream for 18 h, transferred to a 65° C. convection oven for 28 h, and then cooled to room temperature. The coalesced particle hybrid monoliths were then extruded from the columns and vacuum dried for 7.5 h at room temperature.

The specific surface area (SSA), specific pore volumes (SPV) and the average pore diameters (APD) of the resultant materials are listed in Table 15 and were measured using the multi-point $N_2$ sorption method (Micromeritics ASAP 2400 instrument or equivalent, Micromeritics, Norcross, Ga.). The specific surface area was calculated using the BET method, the specific pore volume was the single point value determined at $P/P_0>0.98$, and the average pore diameter was calculated from the desorption leg of the isotherm using the BJH method.

TABLE 15

| Product | Sylgard® treatment | Pre-polymerization time of Sylgard 184® solution | Coalesced particles observed by SEM? | SSA (m²/g) | SPV (cm³/g) | APD (Å) |
|---|---|---|---|---|---|---|
| 35a | Yes | <2 hours | No | 113 | 0.42 | 114 |
| 35b | Yes | 3 hours | Yes | 119 | 0.45 | 115 |
| 35c | Yes | 25 hours | Yes | 120 | 0.45 | 114 |
| 35d | Yes | 72 hours | Partial | 118 | 0.44 | 116 |
| Control | None | NA | NA | 129 | 0.48 | 117 |

Example 36

A non-ionic surfactant, Pluronic P-105 (P-105; BASF, Mount Olive, N.J.) or Triton X-100 (X-100; Aldrich Chemical) was dissolved in a glacial acetic acid (J.T. Baker) and water solution. To this solution, a mixture of methyltrimethoxysilane and tetramethoxysilane (both from Gelest Inc.) was added at 0° C. with stirring for 30 min. The resulting solution was sealed in a glass vial and kept at 45° C. for 3 days. The solution solidified, and a white solid rod was produced. Thus rod was then immersed into an 1 M ammonium hydroxide (J.T. Baker) water solution at 60° C. for 3 days. After washing out the ammonium hydroxide using water, the rod was immersed in a tris(hydroxymethyl) aminomethane (TRIS; Aldrich Chemical) and water solution. The pH of the solution was then adjusted as desired by adding glacial acetic acid (J.T. Baker). The resulting solution and immersed rod was then enclosed in a stainless steel autoclave and heated to 155° C. for 24 h.

After the autoclave cooled down to room temperature, the rod was washed repeatedly with water and methanol, dried in the air for 4 h, and then vacuum dried at 80° C. for 1 day. Detailed reagent amounts and reaction conditions used to prepare these hybrid monolith materials are listed in Table 16. The post hydrothermal compositions were confirmed using combustion analysis or % CHN (CE-440 Elemental Analyzer or equivalent; Exeter Analytical Inc., North Chelmsford, Mass.), $^{13}$C and $^{29}$Si CPMAS NMR spectroscopy (Bruker MSL-300 NMR spectrometer or equivalent, Bruker, Billerica, Mass.).

The median macropore diameter (MPD) and macropore pore volume (MPV) of the resultant materials was measured by Mercury Porosimetry (Micromeritics AutoPore II 9220 or AutoPore IV or equivalent, Micromeritics, Norcross, Ga.) and are listed in Table 17. The specific surface area (SSA), specific pore volumes (SPV), and average pore diameters (APD) of the resultant materials are listed in Table 17 and were measured and calculated as described in Example 35. The micropore surface area (MPA), which is defined as the surface area in pores with diameters less than or equal to 34 Å, was also determined from the adsorption leg of the isotherm using the BJH method.

Example 37

A non-ionic surfactant, Pluronic P-105 (P-105; BASF) or Pluronic P-123 (P-12; BASF) was dissolved in a glacial acetic acid (J.T. Baker) water solution. To this solution, a mixture of 1,2-bis-(trimethoxysilyl)ethane (Aldrich Chemical) and tetramethoxysilane (Gelest Inc.) was added at 0° C. with stirring for 30 min. The resulting solution was sealed in a glass vial and kept at 45° C. for 2 days. The solution solidified, and a white solid rod was produced, which was then immersed into an 1 M ammonium hydroxide (J.T. Baker) water solution at 60° C. for 2 days. After washing out the ammonium hydroxide using water, the rod was immersed in a tris(hydroxymethyl)aminomethane (TRIS, Aldrich Chemical) and water solution. The pH of the solution was then adjusted as desired by adding glacial acetic acid (J.T. Baker). The resulting solution and immersed rod was then enclosed in a stainless steel autoclave and heated to 155° C. for 24 h.

After the autoclave cooled down to room temperature, the rod was washed repeatedly with water and methanol, dried in the air for 4 h, and then vacuum dried at 80° C. for 1 day. Detailed reagent amounts and reaction conditions to prepare these hybrid monolith materials are listed in Table 16. The post hydrothermal compositions were confirmed using % CHN, $^{13}$C and $^{29}$Si CPMAS NMR spectroscopy as described in Example 36.

The median macropore diameter (MPD) and macropore pore volume (MPV) of these resultant materials are listed in Table 17 and were measured as described in Example 36. The specific surface area (SSA), specific pore volume (SPV), average pore diameter (APD), and micropore surface area (MPA) of these resultant materials are listed in Table 13 were measured and calculated as described in Examples 35 and 36.

Example 38

A non-ionic surfactant, Triton 405 (405; Aldrich Chemical) or Triton X-100 (X-100; Aldrich Chemical) was dissolved in a glacial acetic acid (J.T. Baker) water solution. To this solution, a mixture of methacryloxypropyltrimethoxysilane and tetramethoxysilane (both from Gelest Inc.) was added at 0° C. with stirring for 30 min. The resulting solution was sealed in a glass vial and kept at 45° C. for 3 days. The solution solidified, and white solid rod was produced, which was then immersed into an 1 M ammonium hydroxide (J.T. Baker) water solution at 60° C. for 3 days. After washing out the ammonium hydroxide using water, the rod was immersed in a tris(hydroxymethyl)aminomethane (TRIS, Aldrich Chemical) and water solution. The pH of the solution was then adjusted as desired by adding glacial acetic acid (J.T. Baker). The resulting solution and immersed rod was then enclosed in a stainless steel autoclave and heated to 155° C. for 24 h.

After the autoclave cooled down to room temperature, the rod was washed repeatedly with water and methanol, dried in the air for 4 h, and then vacuum dried at 80° C. for 1 day. Detailed reagent amounts and reaction conditions to prepare these hybrid monolith materials are listed in Table 16.

The methacryloxypropyl group of the hybrid materials were converted into a 3-hydroxypropyl group via hydrolysis of the ester bond during hydrothermal treatment in the autoclave. The post hydrothermal treatment composition of the hybrid material's organic substituent is thus described as a 3-hydroxypropyl or propanol [HO(CH$_2$)$_3$SiO$_{1.5}$] group. Conversion of the ester into the alcohol group was observed by a decrease in the % C of the rods before vs. after treatment. The post hydrothermal compositions were confirmed using % C, $^{13}$C and $^{29}$Si CPMAS NMR spectroscopy as described in Example 36.

The median macropore diameter (MPD) and macropore pore volume (MPV) of these resultant materials are listed in Table 13 and were measured as described in Example 36. The specific surface area (SSA), specific pore volume (SPV), average pore diameter (APD), and micropore surface area (MPA) of these resultant materials are listed in Table 17 and were measured as described in Examples 35 and 36.

azeotropic distillation. Under a blanket of argon protection, the reaction was cooled to room temperature, and 16.3 g of octadecyltrichlorosilane (Aldrich Chemical) and 3.43 g of imidazole (from ACROS, Pittsburgh, Pa.) were slowly added to the reaction mixture. The reaction was then heated to 110° C. for 24 h.

The monoliths were subsequently washed twice with fresh toluene at 110° C. for 30 min, and washed twice with acetone at room temperature, for 30 min. Without drying, the monoliths were immersed into 2100 mL of 0.12 M ammonium acetate solution and heated to 60° C. for 2 h. The monoliths were then washed by water and acetone and dried under vacuum at 80° C. for 24 h. The surface concentration

TABLE 16

| Product | Post-Hydrothermal Composition of Hybrid Material | Surfactant Type | Surfactant (g) | Acetic Acid (mg) | Water (mL) | TMOS (mL) | RTMOS (mL) | Hydrothermal TRIS Conditions ||||
|---|---|---|---|---|---|---|---|---|---|---|---|
| | | | | | | | | Amount (mL/g) | Conc. (Molarity) | pH | Temp. (° C.) |
| 36a | SiO$_2$/(CH$_3$SiO$_{1.5}$)$_{0.5}$ | P-105 | 2.8 | 84 | 20 | 5.33 | 2.67 | 210 | 0.1 | 8.0 | 155 |
| 36b | SiO$_2$/(CH$_3$SiO$_{1.5}$)$_{0.5}$ | P-105 | 0.7 | 27 | 5 | 1.33 | 0.67 | 160 | 0.1 | 8.9 | 155 |
| 36c | SiO$_2$/(CH$_3$SiO$_{1.5}$)$_{0.5}$ | P-105 | 0.7 | 33 | 5 | 1.33 | 0.67 | 500 | 0.1 | 8.0 | 155 |
| 36d | SiO$_2$/(CH$_3$SiO$_{1.5}$)$_{0.5}$ | X-100 | 0.7 | 24 | 5 | 1.33 | 0.67 | 350 | 0.1 | 8.0 | 155 |
| 37a | SiO$_2$/(SiO$_{1.5}$CH$_2$CH$_2$SiO$_{1.5}$)$_{0.15}$ | P-105 | 0.8 | 27 | 5 | 1.6 | 0.4 | 70 | 0.1 | 8.0 | 155 |
| 37b | SiO$_2$/(SiO$_{1.5}$CH$_2$CH$_2$SiO$_{1.5}$)$_{0.15}$ | P-105 | 0.9 | 27 | 5 | 1.6 | 0.4 | 70 | 0.1 | 8.0 | 155 |
| 37c | SiO$_2$/(SiO$_{1.5}$CH$_2$CH$_2$SiO$_{1.5}$)$_{0.15}$ | P-105 | 0.7 | 27 | 5 | 1.6 | 0.4 | 200 | 0.3 | 9.0 | 155 |
| 37d | SiO$_2$/(SiO$_{1.5}$CH$_2$CH$_2$SiO$_{1.5}$)$_{0.25}$ | P-123 | 0.7 | 30 | 5 | 1.43 | 0.57 | 100 | 0.3 | 10.6 | 155 |
| 37e | SiO$_2$/(SiO$_{1.5}$CH$_2$CH$_2$SiO$_{1.5}$)$_{0.25}$ | P-123 | 0.6 | 30 | 5 | 1.43 | 0.57 | 200 | 0.1 | 10.6 | 155 |
| 37f | SiO$_2$/(SiO$_{1.5}$CH$_2$CH$_2$SiO$_{1.5}$)$_{0.25}$ | P-123 | 0.65 | 30 | 5 | 1.43 | 0.57 | 200 | 0.1 | 10.6 | 155 |
| 37g | SiO$_2$/(SiO$_{1.5}$CH$_2$CH$_2$SiO$_{1.5}$)$_{0.25}$ | P-123 | 14.1 | 600 | 100 | 28.6 | 11.4 | 20 | 0.1 | 10.5 | 155 |
| 38a | SiO$_2$/[HO(CH$_2$)$_3$SiO$_{1.5}$]$_{0.15}$ | X-100 | 0.7 | 4.2 | 5 | 1.6 | 0.4 | 670 | 1.2 | 10.6 | 155 |
| 38b | SiO$_2$/[HO(CH$_2$)$_3$SiO$_{1.5}$]$_{0.15}$ | 405 | 0.7 | 4.2 | 5 | 1.6 | 0.4 | 670 | 1.2 | 10.6 | 155 |
| 38c | SiO$_2$/[HO(CH$_2$)$_3$SiO$_{1.5}$]$_{0.15}$ | X-100 | 1.31 | 4.2 | 5 | 1.6 | 0.4 | 80 | 0.1 | 8.0 | 155 |

TABLE 17

| Product | MPD (μm) | MPV (cc/g) | SSA (m$^2$/g) | SPV (cc/g) | APD (Å) | MPA (m$^2$/g) |
|---|---|---|---|---|---|---|
| 36a | 2.4 | 3.56 | 284 | 1.51 | 256 | 126 |
| 36b | 6.2 | 2.75 | 171 | 1.22 | 179 | 42 |
| 36c | 17.6 | 0.85 | 177 | 1.19 | 264 | 50 |
| 36d | 5.4 | 2.8 | 173 | 1.46 | 322 | 47 |
| 37a | 2.98 | 3.11 | 186 | 1.47 | 203 | 7 |
| 37b | 0.76 | 2.91 | 220 | 1.89 | 237 | 21 |
| 37c | 4.7 | 1.38 | 214 | 1.91 | 290 | 59 |
| 37d | 4.4 | 2.42 | 171 | 1.29 | 219 | 9 |
| 37e | 1.34 | 2.1 | 130 | 1.04 | 240 | 14 |
| 37f | 1.21 | 2.11 | 141 | 1.12 | 246 | 14 |
| 37g | 2.14 | 3.7 | 208 | 1.4 | 197 | 7 |
| 38a | 5.1 | 3.15 | 162 | 0.96 | 234 | 37 |
| 38b | 28.2 | 3.15 | 151 | 0.81 | 214 | 39 |
| 38c | 1.5 | 2.77 | 260 | 0.71 | 77 | 20 |

Example 39

Hybrid monoliths prepared according to Examples 36, 37, and 38 were immersed in a 1 M hydrochloric acid solution (Aldrich Chemical) for 24 h at 98° C. After acid treatment was complete, the monoliths were washed with water to a pH above 5 followed by acetone washing (J.T. Baker). The monoliths were then dried at 80° C. under vacuum for 24 h.

Example 40

Hybrid monoliths prepared according to example 36a and 37a were acid washed according to Example 39. The hybrid monoliths were then immersed into 2100 mL toluene and heated to reflux for 2 h to remove residual water by (μmol/m$^2$) of n-octadecylsilane was determined by the difference in the monolith material % C content before and after the surface modification as measured by % C (CE-440 Elemental Analyzer or equivalent; Exeter Analytical Inc., North Chelmsford, Mass.)

A second step surface modification (or end capping) of the previously modified monoliths was performed with chlorotrimethylsilane (Aldrich Chemical). Accordingly, ODS modified monoliths were immersed into 2 L toluene and heated to reflux for 2 h to remove any residue water by azeotropic distillation. Under a blanket of argon protection, the reaction was cooled down to room temperature, and 4.56 g of chlorotrimethylsilane and 3.43 g of imidazole (from ACROS) were slowly added to the reaction mixture. The reaction was then heated to 110° C. for 4 h.

The monoliths were subsequently washed twice with fresh toluene at 110° C. for 30 min, washed twice with acetone at room temperature, for 30 min, and dried under vacuum at 80° C. for 24 h. The carbon content was measured by combustion analysis as described in Example 36. Table 18 lists the monolith materials used in the reaction, the surface concentration of the resultant bonded octadecylsilane (ODS) group, and the total % C of the final monolith after end capping.

TABLE 18

| Product | Hybrid Material Prior to ODS Modification | Hybrid Material (g) | ODS Surface Concentration ($\mu mol/m^2$) | % C Final Modified Monolith |
|---|---|---|---|---|
| 40a | 36a | 12.5 | 2.84 | 21.97 |
| 40b | 37a | 16.0 | 1.92 | 18.16 |

Example 41

Hybrid monoliths prepared according to example 38a were acid washed according to Example 39. The hybrid monoliths (1 g) were then immersed into 30 mL toluene and heated to reflux for 2 h to remove any residual water by azeotropic distillation. Under a blanket of argon protection, the reaction was cooled down to room temperature, and 0.61 g of dodecylisocyanate (Aldrich Chemical) was slowly added. The reaction was then heated to 110° C. for 24 h.

The monoliths were subsequently washed with fresh toluene and acetone twice each at room temperature, for 30 min. Without drying, the monoliths were immersed into 100 mL 1% trifluoroacetic acid acetone/water solution (v/v 1/1) and heated to 60° C. for 30 min. The monoliths were then washed by water and acetone, and dried under vacuum at 80° C. for 24 h. The reaction of the dodecyl isocyanate molecule with the hybrid monolith's hydroxyl group to form a carbamate group and thereby connect the dodecyl chain to the monolith's skeletal structure through a covalent organic bond was established by a 10.84% C difference in the monolith material carbon content before and after the surface modification. The % C was measured by combustion analysis as described in Example 36. That increase in % C is analogous to a surface concentration of 2.76 $\mu mol/m^2$ of O-propylsilyl N-dodecyl carbamate groups. Furthermore, $^{13}$C CPMAS NMR spectroscopy of the particles showed resonances consistent with addition product, where 40% of the propanol groups were converted to carbamate groups, and the remaining propanol groups remained unreacted.

Example 42

Hybrid monoliths prepared according to example 38a were acid washed according to Example 39. In a three-neck flask, 1 g of the hybrid monoliths were immersed into a mixture of 50 mL tetrahydrofuran, 0.72 g 1,2-epoxydodecane, and 0.06 g iron(III) chloride (all from Aldrich Chemical) at room temperature. The mixture was kept at room temperature with stirring for 4 h. The hybrid monolith was then removed from the reaction mixture and extensively washed with 1% (by w %) hydrochloric acid water solution, acetone/water, and acetone. The monoliths were then dried under vacuum at 80° C. for 24 h.

Reaction of the 1,2-epoxydodecane molecule with the hybrid monolith's hydroxyl group to form a hydroxyl substituted ether group and thereby connect the decyl chain to the monolith's skeletal structure through a covalent organic bond was established by a 6.55% C difference in the monolith material carbon content before and after the surface modification. The % C was measured by combustion analysis as described in Example 30. That increase in % C is analogous to a surface concentration of 1.80 $\mu mol/m^2$ of decyl ether groups. Furthermore, $^{13}$C CPMAS NMR spectroscopy of the particles showed resonances consistent with addition product, where 30% of the propanol groups were converted to ether groups, and the remaining propanol groups remained unreacted.

Example 43

Hybrid monoliths prepared according to example 38a were acid washed according to Example 39. A 1 g quantity of the hybrid monoliths was then immersed into 1000 mL toluene with 0.37 g p-toluenesulfonic acid monohydrate (Aldrich Chemical) and heated to reflux for 2 h to remove any residual water by azeotropic distillation. Under a blanket of argon protection, an additional funnel filled with a mixture of 15 mL toluene and 3.07 g of n-decylalcohol (Aldrich Chemical) was attached directly onto the top of the flask, and the solution was slowly added to the reaction mixture over a period of 2 h. The reaction was then heated to reflux for 24 h, whereupon the water generated as one of the reaction products was continually removed by azeotropic distillation. After the reaction was cooled down, the monoliths were then washed by water and acetone, and dried under vacuum at 80° C. for 24 h.

The reaction of the n-decylalcohol molecule with the hybrid monolith's hydroxyl group to form an ether group and thereby connect the decyl chain to the monolith's skeletal structure through a covalent organic bond was established by a 6.04% C difference in the monolith material carbon content before and after the surface modification. The % C was measured by combustion analysis as described in Example 36. That increase in % C is analogous to a surface concentration of 1.66 $\mu mol/m^2$ of decyl ether groups. Furthermore, $^{13}$C CPMAS NMR spectroscopy of the particles showed resonances consistent with addition product, where 30% of the propanol groups were converted to ether groups, and the remaining propanol groups remained unreacted.

Incorporation By Reference

The entire contents of all patents, published patent applications and other references cited herein are hereby expressly incorporated herein in their entireties by reference.

Equivalents

Those skilled in the art will recognize, or be able to ascertain using no more than routine experimentation, numerous equivalents to the specific procedures described herein. Such equivalents were considered to be within the scope of this invention and are covered by the following claims. The contents of all references, issued patents, and published patent applications cited throughout this application are hereby incorporated by reference.

What is claimed is:

1. A porous inorganic/organic hybrid monolith material, comprising a chromatographically-enhancing pore geometry and having the formula $SiO_2/(R^2_pR^4_qSiO_t)_n$ or $SiO_2/[R^6(R^2_rSiO_t)_m]_n$ wherein $R^2$ and $R^4$ are independently $C_1$-$C_{18}$ aliphatic, styryl, vinyl, propanol, or aromatic moieties, $R^6$ is a substituted or unsubstituted $C_1$-$C_{18}$ alkylene, alkenylene, alkynylene or arylene moiety bridging two or more silicon atom, p and q are 0, 1 or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2, and n is a number from 0.03 to 1.

2. A porous inorganic/organic hybrid monolith material, comprising coalesced porous inorganic/organic hybrid particles having a chromatographically-enhancing pore geometry, wherein said hybrid particles have been surface modified with a surface modifier having the formula $Z_a(R')_b Si$—R, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group.

3. The hybrid monolith material of claim 1 or 2, wherein pores of a diameter of less than about 34 Å contribute less than about 110 m$^2$/g to less than about 50 m$^2$/g to the specific surface area of the material.

4. A porous inorganic/organic hybrid monolith material, comprising coalesced porous inorganic/organic hybrid particles that have a chromatographically-enhancing pore geometry and having the formula $SiO_2/(R^2_p R^4_q SiO_t)_n$ or $SiO_2/[R^6(R^2_r SiO_t)_m]_n$ wherein $R^2$ and $R^4$ are independently $C_1$-$C_{18}$ aliphatic, styryl, vinyl, propanol, or aromatic moieties, $R^6$ is a substituted or unsubstituted $C_1$-$C_{18}$ alkylene, alkenylene, alkylene or arylene moiety bridging two or more silicon atoms, p and q are 0, 1 or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2, and n is a number from 0.03 to 1, wherein said particles have been surface modified by a surface modifier selected from die group consisting of an organic group surface modifier, a silanol group surface modifier, a polymeric coating surface modifier, and combinations thereof.

5. The hybrid monolith material of claim 3, wherein said hybrid particles have been surface modified with a surface modifier having the formula $Z_a(R')_b Si$—R, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group.

6. The hybrid monolith material of claim 2, wherein said hybrid particles have a specific surface area of about 50 to 800 m$^2$/g.

7. The hybrid monolith material of claim 2, wherein said hybrid particles have a specific surface area of about 75 to 600 m$^2$/g.

8. The hybrid monolith material of claim 2, wherein said hybrid particles have a specific surface area of about 100 to 350 m$^2$/g.

9. The hybrid monolith material of claim 2, wherein said hybrid particles have specific pore volumes of about 0.25 to 1.5 cm$^3$/g.

10. The hybrid monolith material of claim 2, wherein said hybrid particles have specific pore volumes of about 0.4 to 1.2 cm$^3$/g.

11. The hybrid monolith material of claim 2, wherein said hybrid particles have a micropore surface area of less than about 110 m$^2$/g.

12. The hybrid monolith material of claim 11, wherein said hybrid particles have a micropore surface area of less than about 105 m$^2$/g.

13. The hybrid monolith material of claim 11, wherein said hybrid particles have a micropore surface area of less than about 80 m$^2$/g.

14. The hybrid monolith material of claim 11, wherein said hybrid particles have a micropore surface area of less than about 50 m$^2$/g.

15. The hybrid monolith material of claim 2, wherein said hybrid particles have an average pore diameter of about 50 to 500 Å.

16. The hybrid monolith material of claim 2, wherein said hybrid particles have an average pore diameter of about 100 to 300 Å.

17. The hybrid monolith material of claim 2, wherein said hybrid particles have a specific surface area of about 50 to 800 m$^2$/g, said hybrid particles have specific pore volumes of about 0.25 to 1.5 cm$^3$/g, and said hybrid particles have an average pore diameter of about 50 to 500 Å.

18. The hybrid monolith material of claim 4, wherein said hybrid particles have been surface modified by coating with a polymer.

19. The hybrid monolith material of claim 2 or 5, wherein R' is selected from the group consisting of methyl, ethyl, propyl, isopropyl, butyl, t-butyl, sec-butyl, pentyl, isopentyl, hexyl and cyclohexyl.

20. The hybrid monolith material of claim 19, wherein the functionalizing group R is selected from the group consisting of alkyl, alkenyl, alkynyl, aryl, cyano, amino, diol, nitro, ester, a cation or anion exchange group, or an alkyl or aryl group containing an embedded polar functionality.

21. The hybrid monolith material of claim 20, wherein said functionalizing group R is a $C_1$-$C_{30}$ alkyl group.

22. The hybrid monolith material of claim 20, wherein said functionalizing group R is a $C_1$-$C_{20}$ alkyl group.

23. The hybrid monolith material of claim 4, wherein said surface modifier is selected from the group consisting of octyltrichlorosilane, octadecyltrichlorosilane, octyldimethylchlorosilane, and octadecyldimethylchlorosilane.

24. The hybrid monolith material of claim 23, wherein said surface modifier is selected from the group consisting of octyltrichlorosilane and octadecyltrichlorosilane.

25. The hybrid monolith material of claim 2 having the formula $SiO_2/(R^2_p R^4_q SiO_t)_n$ or $SiO_2/[R^6(R^2_r SiO_t)_m]_n$ wherein $R^2$ and $R^4$ are independently $C_1$-$C_{18}$ aliphatic, styryl, vinyl, propanol, or aromatic moieties, $R^6$ is a substituted or unsubstituted $C_1$-$C_{18}$ alkylene, alkenylene, alkylene or arylene moiety bridging two or more silicon atoms, p and q are 0, 1 or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2, and n is a number from 0.03 to 1.

26. The hybrid monolith material of claim 1, 4 or 25, wherein n is a number from 0.1 to 1.

27. The hybrid monolith material of claim 25 having average pore diameters of about 100 to 300 Å.

28. The hybrid monolith material of claim 25 wherein n is a number from 0.20 to 0.5.

29. The hybrid monolith material of claim 2 or 4 wherein said inorganic portion of said hybrid monolith material is selected from the group consisting of alumina, silica, titanium or zirconium oxides, and ceramic materials.

30. The hybrid monolith material of claim 2 or 4 wherein said inorganic portion of said hybrid monolith material is silica.

31. The hybrid material of claim 2 or 4, wherein said particles have been surface modified by a combination of an organic group surface modifier and a silanol group surface modifier.

32. The hybrid material of claim 2 or 4, wherein said particles have been surface modified by a combination of an organic group surface modifier and a polymeric coating surface modifier.

33. The hybrid material of claim 2 or 4, wherein said particles have been surface modified by a combination of a silanol group surface modifier and a polymeric coating surface modifier.

34. The hybrid material of claim 2 or 4, wherein said particles have been surface modified via formation of an organic covalent bond between an organic group of the particle and a surface modifier.

35. The hybrid material of claim 2 or 4, wherein said particles have been surface modified by a combination of an organic group surface modifier, a silanol group surface modifier, and a polymeric coating surface modifier.

36. The hybrid material of claim 2 or 4, wherein said particles have been surface modified by a silanol group surface modifier.

37. A method of preparation of a porous inorganic/organic hybrid monolith material, of claim 4, comprising the steps of
 a) forming porous inorganic/organic hybrid particles,
 b) modifying the pore structure of said porous hybrid particles, and
 c) coalescing said porous hybrid particles to form a monolith material.

38. The method of claim 37, wherein said particles have been surface modified by a polymeric coating surface modifier.

39. The method of claim 37, wherein said particles have been surface modified by a combination of an organic group surface modifier and a silanol group surface modifier.

40. The method of claim 37, wherein said particles have been surface modified by a combination of an organic group surface modifier and a polymeric coating surface modifier.

41. The method of claim 37, wherein said particles have been surface modified by a combination of a silanol group surface modifier and a polymeric coating surface modifier.

42. The method of claim 37, wherein said particles have been surface modified by a combination of an organic group surface modifier, a silanol group surface modifier, and a polymeric coating surface modifier.

43. The method of claim 37, wherein said particles have been surface modified by a silanol group surface modifier.

44. The method of claim 37, wherein said particles have been surface modified via formation of an organic covalent bond between an organic group of the particle and a surface modifier.

45. The porous inorganic/organic hybrid monolith material of claim 1, wherein said material contains a plurality of macropores sufficient to result in reduced backpressure at chromatographically-useful flow rates.

46. The hybrid monolith material of claim 45, wherein the macropores are pores with a pore diameter larger than about 0.05 μm.

47. The porous inorganic/organic hybrid monolith material, having of claim 1, wherein said monolith material has been surface modified by a surface modifier selected from the group consisting of an organic group surface modifier, a silanol group surface modifier, a polymeric coating surface modifier, and combinations thereof.

48. The hybrid monolith material of claim 47, wherein said monolith material has been surface modified with a surface modifier having the formula $Z_a(R')_bSi\text{—}R$, where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R is a functionalizing group.

49. The hybrid monolith material of claim 46 or 48, wherein said monolith has been surface modified by a polymeric coating surface modifier.

50. The hybrid monolith material of claim 48 wherein R' is selected from the group consisting of methyl, ethyl, propyl, isopropyl, butyl, t-butyl, sec-butyl, pentyl, isopentyl, hexyl and cyclohexyl.

51. The hybrid monolith material of claim 48, wherein the functionalizing group R is selected from the group consisting of alkyl, alkenyl, alkynyl, aryl, cyano, amino, diol, nitro, ester, a cation or anion exchange group, or an alkyl or aryl group containing an embedded polar functionality.

52. The hybrid monolith material of claim 51, wherein said functionalizing group R is a $C_1$-$C_{30}$ alkyl group.

53. The hybrid monolith material of claim 51, wherein said functionalizing group R is a $C_1$-$C_{20}$ alkyl group.

54. The hybrid monolith material of claim 48, wherein said surface modifier is selected from the group consisting of octyltrichlorosilane, octadecyltrichlorosilane, octyldimethylchlorosilane, octadecyldimethylchlorosilane, and octadecyltrimethoxysilane.

55. The hybrid monolith material of claim 54, wherein said surface modifier is selected from the group consisting of octyltrichlorosilane and octadecyltrichlorosilane.

56. The hybrid monolith material of claim 54, wherein said surface modifier is octadecyltrichlorosilane.

57. The hybrid monolith material of claim 1, wherein n is a number from 0.1 to 1.

58. The hybrid monolith material of claim 1, wherein n is a number from 0.2 to 0.5.

59. The hybrid monolith material of claim 45 or 47 wherein said inorganic portion of said hybrid monolith material is selected from the group consisting of alumina, silica, titanium or zirconium oxides, and ceramic materials.

60. The hybrid monolith material of claim 45 or 47 wherein said inorganic portion of said hybrid monolith material is silica.

61. The hybrid monolith material of claim 45 or 48, wherein said monolith material has been surface modified by a combination of an organic group surface modifier and a silanol group surface modifier.

62. The hybrid monolith material of claim 45 or 48, wherein said monolith material has been surface modified by a combination of an organic group surface modifier and a polymeric coating surface modifier.

63. The hybrid monolith material of claim 45 or 48, wherein said monolith material has been surface modified by a combination of a silanol group surface modifier and a polymeric coating surface modifier.

64. The hybrid monolith material of claim 45 or 48, wherein said monolith material has been surface modified by a combination of an organic group surface modifier, a silanol group surface modifier, and a polymeric coating surface modifier.

65. The hybrid monolith material of claim 45 or 48, wherein said monolith material has been surface modified by a silanol group surface modifier.

66. The hybrid monolith material of claim 45 or 48, wherein said monolith material has been surface modified via formation of an organic covalent bond between an organic group of the particle and a surface modifier.

67. A method of preparation of a porous inorganic/organic hybrid monolith material of claim 2, comprising the steps of
 a) forming a porous inorganic/organic hybrid particles,
 b) modifying the pore structure of said porous hybrid particles, and
 c) coalescing said porous hybrid particles to form a monolith material.

68. The porous inorganic/organic hybrid monolith material of claim 2 or 4, wherein said material contains a plurality of macropores sufficient to result in reduced backpressure at chromatographically-useful flow rates.

69. The hybrid monolith material of claim 68, wherein the macropores are pores with a pore diameter larger than about 0.05 μm.

70. The method of claim 37 or 67, wherein the porous hybrid particles are coalesced by sintering.

71. The method of claim 37 or 67, wherein the porous hybrid particles are mixed with a second material that is removed after coalescence of the porous hybrid particles.

72. The method of claim 71, wherein the second material is unbonded silica.

73. The method of claim 37 or 67 wherein said porous hybrid particles are prepared by prepolymerizing one or more organoalkoxysilanes and a tetraalkoxysilane to produce a polyorganoalkoxysiloxane, and preparing an aqueous suspension of said polyorganoalkoxysiloxane, and gelling in the presence of a base catalyst so as to produce said porous hybrid particles.

74. The method of claim 37 or 67 wherein said porous hybrid particles are prepared by prepolymerizing one or more organotrialkoxysilanes and a tetraalkoxysilane to produce a polyalkyloxysiloxane, preparing an aqueous suspension of said polyalkyloxysiloxane, and gelling in the presence of a base catalyst so as to produce said porous hybrid particles.

75. The method of claim 73 wherein said pore structure of said porous hybrid particles is modified by further including a surfactant or combination of different surfactants in said suspension, and by subjecting said porous hybrid particles to hydrothermal treatment.

76. The method of claim 73 wherein said pore structure of said porous hybrid particles is modified by further including a combination of different surfactants in said suspension, and by subjecting said porous hybrid particles to hydrothermal treatment.

77. The method of claim 75 wherein said surfactant or combination of surfactants are selected from the group consisting of Triton X-45, sodium dodecylsulfate, tris(hydroxymethyl)aminomethane lauryl sulfate, and any combination thereof.

78. The method of claim 37 or 67 wherein said method further comprises surface modifying said porous hybrid particles.

79. The method of claim 73 wherein said prepolymerization step comprises hydrolyzing and condensing a mixture of one or more organoalkoxysilanes and a tetraalkoxysilane in the presence of an acid catalyst to produce said polyalkyloxysiloxane.

80. The method of claim 74 wherein said prepolymerization step comprises hydrolyzing and condensing a mixture of one or more organotrialkoxysilanes and a tetraalkoxysilane in the presence of an acid catalyst to produce said polyalkyloxysiloxane.

81. The method of claim 37 or 67 wherein said porous inorganic/organic hybrid particles have the formula $SiO_2/(R^2_p R^4_q SiO_t)_n$ or $SiO_2/[R^6(R^2_r SiO_t)_m]_n$ wherein $R^2$ and $R^4$ are independently $C_1$-$C_{18}$ aliphatic, styryl, vinyl, propanol, or aromatic moieties, $R^6$ is a substituted or unsubstituted $C_1$-$C_{18}$ alkylene, alkenylene, alkynylene or arylene moiety bridging two or more silicon atoms, p and q are 0, 1 or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2, and n is a number from 0.03 to 1.

82. The method of claim 81, wherein n is a number from 0.1 to 1.

83. The method of claim 81 wherein said porous inorganic/organic hybrid particles have average pore diameters of about 100 to 300Å.

84. The method of claim 81 wherein n is a number from 0.2 to 0.5.

* * * * *